US010896222B1

(12) United States Patent
Christodoulopoulos et al.

(10) Patent No.: US 10,896,222 B1
(45) Date of Patent: Jan. 19, 2021

(54) SUBJECT-SPECIFIC DATA SET FOR NAMED ENTITY RESOLUTION

(71) Applicant: Amazon Technologies, Inc., Seattle, WA (US)

(72) Inventors: Christos Christodoulopoulos, Cambridge (GB); Arpit Mittal, Cambridge (GB); Andrew Christopher Graham Hopkinson, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 321 days.

(21) Appl. No.: 15/635,873

(22) Filed: Jun. 28, 2017

(51) Int. Cl.

| | |
|---|---|
| ***G06F 16/901*** | (2019.01) |
| ***G06N 5/02*** | (2006.01) |
| ***G06F 16/22*** | (2019.01) |
| ***G06F 40/295*** | (2020.01) |

(52) U.S. Cl.
CPC ...... *G06F 16/9017* (2019.01); *G06F 16/2228* (2019.01); *G06F 16/9024* (2019.01); *G06F 40/295* (2020.01); *G06N 5/02* (2013.01)

(58) Field of Classification Search
CPC ............... G06F 17/278; G06F 16/9024; G06F 16/9017; G06F 40/295; G06F 16/951; G06F 16/81; G06F 16/316; G06N 5/02
See application file for complete search history.

(56) References Cited

U.S. PATENT DOCUMENTS 8,161,059 B2 * 4/2012 Guo ........................ G06Q 30/02 707/758
8,429,099 B1 * 4/2013 Perkowitz ............. G06Q 10/10 706/12
9,135,329 B1 * 9/2015 Gupta .................... G06Q 30/02
2006/0026189 A1 * 2/2006 Djugash ............ G06F 16/24578
2007/0094210 A1 * 4/2007 Craig ........................ G06N 5/02 706/50
2009/0144609 A1 * 6/2009 Liang ...................... G06F 17/21 715/230
2010/0004925 A1 * 1/2010 Ah-Pine ................ G06F 40/295 704/9
2010/0131485 A1 * 5/2010 Hu ........................ G06F 16/957 707/706
2010/0174528 A1 * 7/2010 Oya ...................... G06F 40/268 704/10

(Continued)

OTHER PUBLICATIONS

Zhang et al., "A Novel Approach to Automatic Gazetteer Generation using Wikipedia", Proceedings of the 2009 Workshop on the People's Web Meets NLP, ACL-IJCNLP, Published 2009 (Year: 2009).*

(Continued)

*Primary Examiner* — David T. Brooks
(74) *Attorney, Agent, or Firm* — EIP US LLP

(57) ABSTRACT

A method comprising receiving subject data indicative of a subject entity. First entity data is obtained from a knowledge database using the subject data, the first entity data representative of a first related entity related to the subject entity. First text data is obtained from the knowledge database using the first entity data, the first text data representative of first text associated with the first related entity. A subject entity data set is generated. The subject entity data set comprises first related entity data based on the first entity data, and the first text data.

20 Claims, 12 Drawing Sheets

(56) References Cited

U.S. PATENT DOCUMENTS

2011/0307435 A1* 12/2011 Overell ................ G06F 17/278 706/46
2012/0078918 A1* 3/2012 Somasundaran ..... G06F 40/284 707/748
2012/0284224 A1* 11/2012 Yan ...................... G06F 16/951 707/603
2012/0284259 A1* 11/2012 Jehuda ................. G06F 16/367 707/722
2013/0191376 A1* 7/2013 Zhiyanov ........... G06F 16/9537 707/723
2013/0346421 A1* 12/2013 Wang ................. G06F 16/3346 707/748
2015/0095303 A1* 4/2015 Sonmez ................ G06N 5/003 707/707
2015/0134685 A1* 5/2015 Sekharan ............. G06F 16/958 707/758
2015/0158400 A1* 6/2015 Yin ....................... B60N 2/995 297/67
2015/0324454 A1* 11/2015 Roberts ................ G06F 16/338 707/734
2018/0173694 A1* 6/2018 Liu ....................... G06N 20/00
2019/0005395 A1* 1/2019 Dutkowski ........... G06N 5/022

OTHER PUBLICATIONS

Ni et al., "Enhancing the Open-Domain Classification of Named Entity Using Linked Open Data", ISWC 2010, LNCS, pp. 566-581. (Year: 2010).*

Rao et al., "Entity Linking: Finding Extracted Entities in a Knowledge Base", In: Multi-source, Multilingual Information Extraction and Summarization.Theory and Applications of Natural Language Processing. Springer, Berlin, Heidelberg. 2012 (Year: 2012).*

Shwartz, Vered, Yoav Goldberg, and Ido Dagan. "Improving hypernymy detection with an integrated path-based and distributional method." arXiv preprint arXiv:1603.06076 (2016).

* cited by examiner

Figures 2, 3:
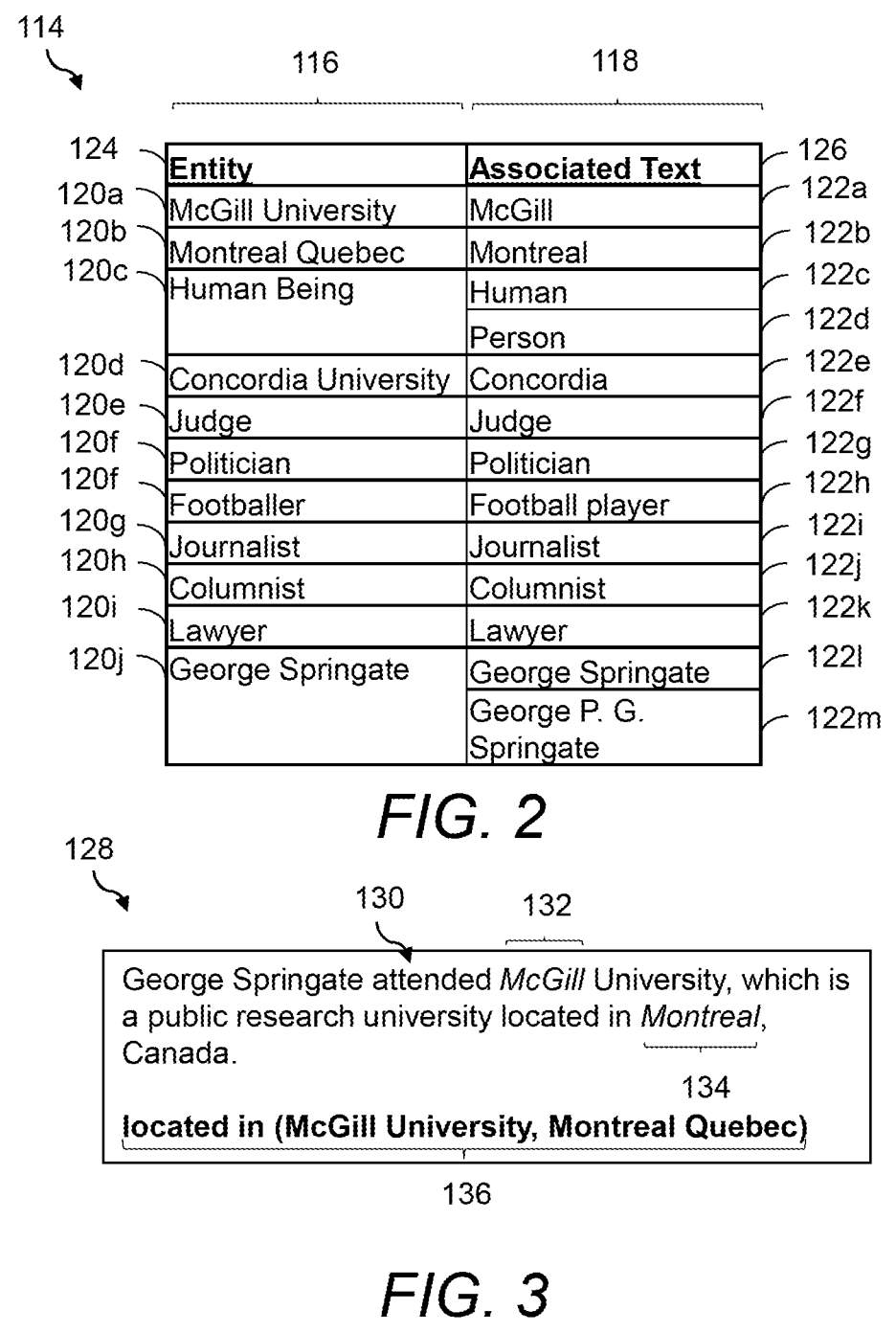

114

| Entity | Associated Text |
|---|---|
| McGill University | McGill |
| Montreal Quebec | Montreal |
| Human Being | Human |
| | Person |
| Concordia University | Concordia |
| Judge | Judge |
| Politician | Politician |
| Footballer | Football player |
| Journalist | Journalist |
| Columnist | Columnist |
| Lawyer | Lawyer |
| George Springate | George Springate |
| | George P. G. Springate |

*Call Your Girlfriend* was written by Robyn, Alexander Kronlund and Klas Åhlund, with the latter producing the *song*.
instance of (Call Your Girlfriend, song)

*Forget Her* is a *song* by Jeff Buckley.
instance of (Forget Her, song)

The *Subei Mongol Autonomous County* is an autonomous *county* within the prefecture-level city of Jiuquan in the northwestern Chinese province of Gansu
instance of (Subei Mongol Autonomous County, Chinese county)

FIG. 9

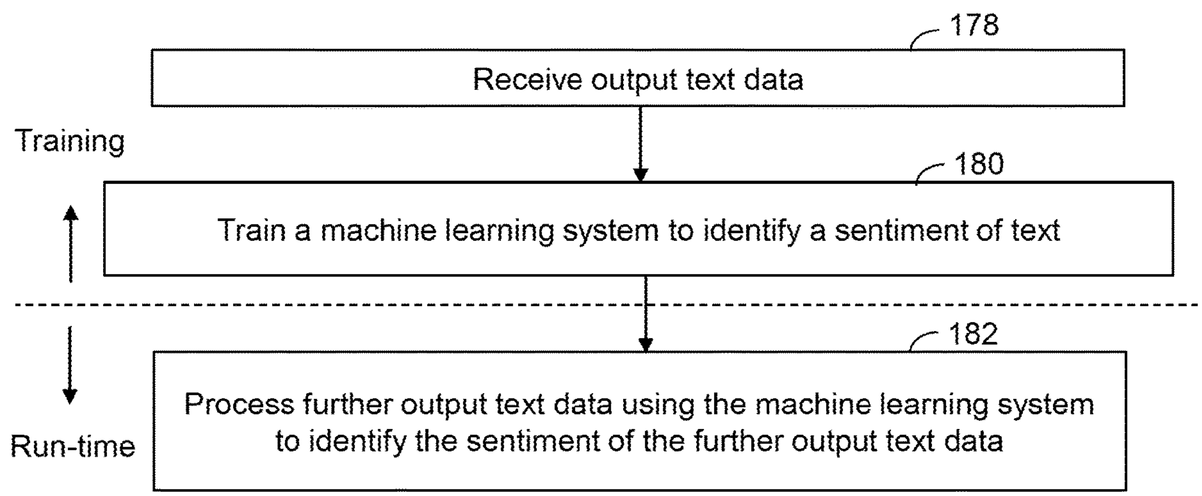

FIG. 10

SUBJECT-SPECIFIC DATA SET FOR NAMED ENTITY RESOLUTION

BACKGROUND

A vast amount of information is stored in unstructured formats. For example, there is a large quantity of unstructured text data, which is typically difficult for a computer to resolve into distinct entities via named entity resolution or to map to a predefined structure such as a knowledge database for further use or processing.

It is desirable to provide improved data processing techniques for obtaining information from unstructured sources.

SUMMARY

In a first aspect, a method of at least partially populating a first look-up table with first look-up table data is provided. The method includes receiving subject data indicative of a subject entity. The method includes processing a knowledge database using the subject data to identify subject entity data representative of the subject entity, the knowledge database comprising: entity data representative of a plurality of entities comprising the subject entity; text data representative of text associated with respective entities of the plurality of entities; and relationship data representative of relationships between respective pairs of entities of the plurality of entities. The method includes identifying first related entity data from the knowledge database, the first related entity data representative of a first related entity related to the subject entity by a relationship which satisfies a relationship condition. The method includes obtaining first text data from the text data of the knowledge database, the first text data representative of first text associated with the first related entity. The method includes storing the first related entity data and the first text data as first look-up table data in the first look-up table so as to indicate an association between the first related entity data and the first text data.

In a second aspect, a method is provided. The method includes receiving subject data indicative of a subject entity. The method includes obtaining first entity data from a knowledge database using the subject data, the first entity data representative of a first related entity related to the subject entity. The method includes obtaining first text data from the knowledge database using the first entity data, the first text data representative of first text associated with the first related entity. The method includes generating a subject entity data set, the subject entity data set comprising: first related entity data based on the first entity data; and the first text data.

In a third aspect, a system is provided. The system includes at least one processor. The system includes at least one memory comprising computer program instructions. The at least one memory and the computer program instructions are operable to, with the at least one processor: receive subject data indicative of a subject entity; obtain first entity data from a knowledge database using the subject data, the first entity data representative of a first related entity related to the subject entity; obtain first text data from the knowledge database using the first entity data, the first text data representative of first text associated with the first related entity; and generate a subject entity data set, the subject entity data set comprising: first related entity data based on the first entity data; and the first text data.

BRIEF DESCRIPTION OF THE DRAWINGS

FIG. 2 illustrates schematically an example of a subject entity data set;

FIG. 3 illustrates schematically an example output of named entity resolution according to examples described herein;

FIG. 9 illustrates schematically an example output of processing text data using the method of FIG. 8;

FIG. 10 is a flow diagram showing a use of a subject entity data set according to yet further examples;

DETAILED DESCRIPTION

Figure 1:
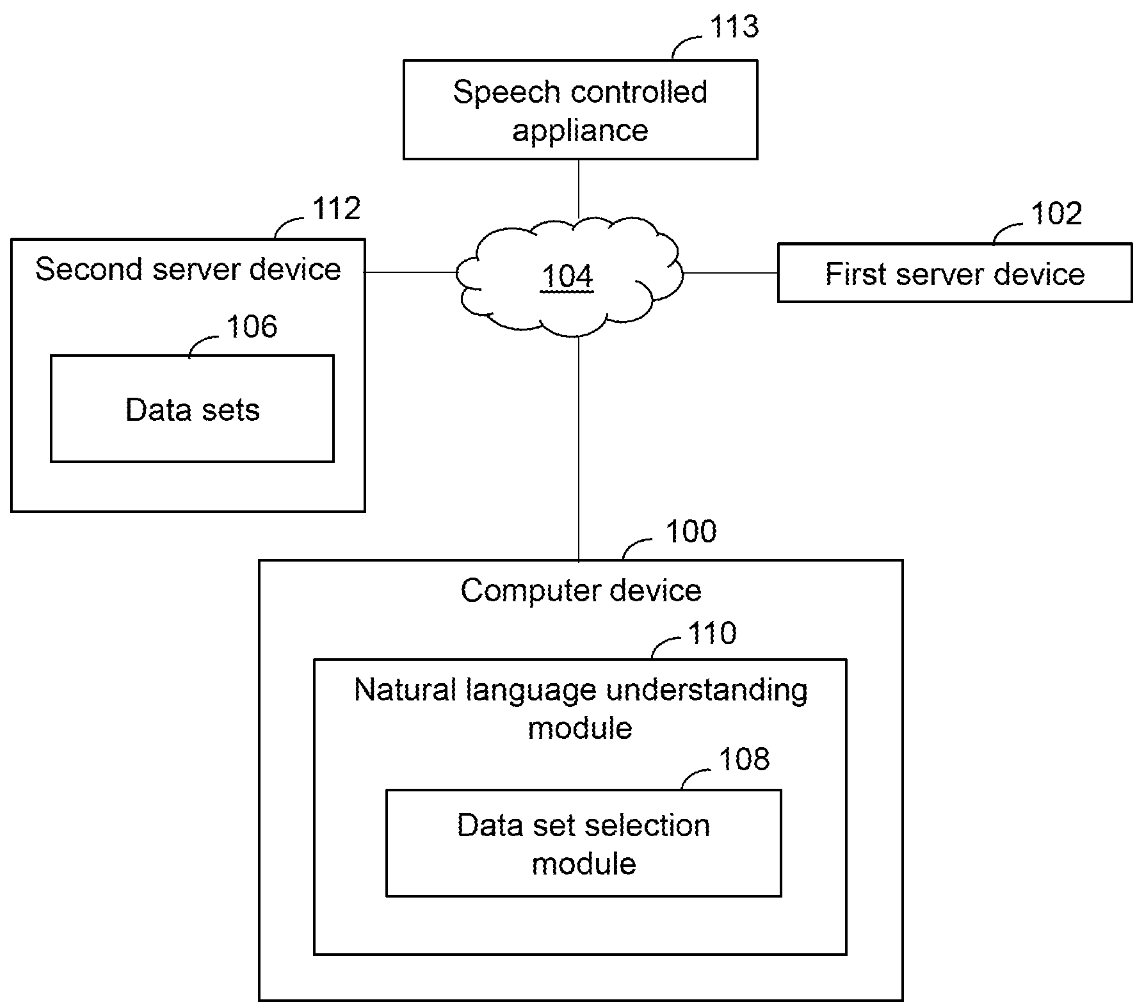
FIG. 1 is a schematic diagram showing an example system for processing unstructured text data using a subject entity data set.

Natural language processing (NLP) is a field of computer science, artificial intelligence, and linguistics concerned with the interactions between computers and human languages, sometimes referred to as natural languages. Natural language processing includes natural language understanding (NLU), which deals with machine reading comprehension, enabling computers to derive meaning from text data representative of natural language.

A knowledge database typically includes numerous facts, usually in the form of fact triples (sometimes referred to simply as a "triple"). A fact triple generally corresponds to a particular subject-predicate-object expression, which can be used in computer-based question answering. For example, a knowledge database that includes facts that express the relationship between a subject and a predicate allows a question based on two of the subject-predicate-object fact triple to be answered using the knowledge database. Such fact triples can be expressed in the form of predicate (subject, object), where the predicate is a relationship or relation and the subject and object may be considered to be entities that participate in that relationship. For example, if a user asks a question, either via a text input or by a voice input, such as "Who wrote the novel Postcards from the Edge?" and the knowledge database includes the fact triple author of (Postcards from the Edge, Carrie Fisher) in the form of predicate (subject, object), the question can be answered successfully, and the answer "Carrie Fisher" can be returned in response to the question.

However, a large proportion of available data, such as webpages or documents, include unstructured text and are therefore in the format of unstructured text data. Unstructured text data may be considered to be data that does not adhere to a predefined structure or data model or that has a structure which, though organized to some extent, does not allow text represented by the unstructured text data to be readily extracted or mapped to a named entity, which generally corresponds to a particular class of object or concept, such as location or human being (sometimes referred to as named entity recognition). It is typically also difficult to map or associate text represented by unstructured text data to a particular instance of a named entity (sometimes referred to as named entity resolution).

In some cases, unstructured text data may lack metadata or may include metadata that is not useful for determining whether the text represented by the unstructured text data corresponds to a named entity. This can present a difficulty for named entity recognition or named entity resolution of the unstructured text.

In view of the above, NLU of unstructured text may not be straightforward. NLU typically involves relation extraction (which for example relates to determining relationships or facts between named entities) in addition to named entity recognition and named entity resolution (sometimes referred to as named entity linking). Whereas named entity recognition in examples involves identifying portions, such as words or phrases, of the unstructured text that correspond to a particular class of object or concept, named entity resolution typically involves determining the precise entity of that particular class a word or phrase of the unstructured text corresponds to. For example, named entity resolution may involve identifying that a particular portion of unstructured text, such as a word, corresponds to a pre-defined entity such as an entity of a knowledge database. In other words, named entity resolution may involve linking or mapping a word or phrase occurring in unstructured text to a corresponding entity in the knowledge database, which for example represents a particular instance of a class of objects or concepts. As will be explained further below, each entity of a knowledge database may for example correspond with a node of the knowledge database, where the knowledge database is in the form of a graph. Thus, named entity resolution may involve linking a word in unstructured text with the corresponding or associated node in the knowledge database that corresponds with the particular entity represented by the word. For example, while named entity recognition may identify that the term "Chicago" in unstructured text is a location, the aim of named entity resolution would be to determine that the term "Chicago" relates to the particular location Chicago, Ill., which may correspond with the entity Chicago, Ill. of the knowledge database. For example, a particular instance of a named entity may be a real-world object or concept that can be denoted with a proper name, which may be an abstract concept or exist as a physical object. Named entity resolution may include nominal or pronominal co-reference resolution, in other words extracting the same entity regardless of whether the entity is referred to by a proper noun or by a pronoun such as "he" or "she". For example, if the unstructured text states that "Fisher wrote" or "she wrote", with reference to the entity Carrie Fisher, named entity resolution should be able to identify that these are both references to the same entity, for example the entity Carrie Fisher in a knowledge database, rather than two different entities.

Unstructured text may include multiple identical terms, words or text that, despite being identical, nevertheless refer to different entities, such as different entities of a knowledge database. This can complicate named entity resolution. For instance, the term "Chicago" in unstructured text may refer to either a location or to a musical show, making it difficult to unambiguously associate this term in unstructured text with the correct class of object (such as the class location or musical show) or the correct entity (such as the entity Chicago, Ill. or the entity musical show Chicago). This can further make it difficult to associate this term with the correct entity of a knowledge database.

Examples described herein relate to methods for providing named entity resolution of unstructured text, based on a subject of the unstructured text. For example, such methods may be used to provide named entity resolution of text of a webpage related to a particular subject. In examples, a first look-up table which corresponds to the subject of the unstructured text is selected from a plurality of look-up tables, based on the subject data. The first look-up table for example includes first look-up table data that associates text associated with a related entity, which is related to the subject entity. This allows the text to be linked to the appropriate related entity. As explained above, the subject and related entities are for example pre-defined entities, such as entities of a knowledge database. The text is typically the name of the related entity (and may therefore be the same as the name of the entity itself). However, in other cases, the text may be a synonym or an alternative name for the related entity, such as "football player" rather than footballer for the entity footballer. The text may for example be descriptive of the related entity or may denote the related entity. For example, the text data may be considered to represent a denotational string associated with the related entity.

In such examples, the first look-up table data is tailored to the subject itself, and includes related entity data, such as a knowledge database identifier allowing the node of the knowledge database corresponding to the related entity to be located, and text data for entities that are relevant to or that may occur in unstructured text in conjunction with subject text descriptive of the subject entity. The first look-up table data may therefore may considered to be subject-specific look-up table data, and the look-first up table may be considered to be a subject-specific data set, or a subject entity data set.

Using the first look-up table data, unstructured text data, for example representing text from which it is desired to extract a semantic relationship between entities such as named entities of a knowledge database, can be processed to identify words or phrases that are associated with an entity related to the subject entity. For example, text of a webpage can be processed in this way. Such words or phrases are represented by text data of the first look-up table data in examples. For example, a string matching technique may be used to parse the unstructured text data (using the text data) to flag or otherwise identify instances of a word associated with an entity related to the subject entity. For example, the string matching technique may be used to identify first and second strings of the text of the webpage that match first and second text data of the text data, respectively. In this way, instances of the word associated with the entity related to the subject entity can be located in the unstructured text and these instances can be identified, for example by annotation or tagging, for further use. This therefore allows named entity resolution of the unstructured text to be performed.

Methods such as this can help reduce ambiguities when performing named entity resolution. As an illustrative example, if it is determined that the unstructured text relates to a location, the first look-up table data may for example include text data representing the term "Chicago" associated with the entity Chicago, Ill., as the entity Chicago, Ill. may be related to the subject entity location by the relationship instance of, for example. On this basis, mentions or instances of the term "Chicago" in the unstructured text can be identified as corresponding with the entity Chicago, Ill. that is a location rather than a musical show. Conversely, if it is determined that the unstructured text relates to musical shows, mentions of the term "Chicago" in the unstructured text can be identified as corresponding with the entity musical show Chicago that is a musical show rather than a location, as the first look-up table data may indicate that the text "Chicago" is associated with the entity musical show Chicago rather than the entity Chicago, Ill.

As will be appreciated, in further examples, methods such as these may be used to resolve ambiguities that may occur when an object or concept is referred to by the name of something closely associated with that object or concept (referred to as metonymy). For example, the term "Chicago" in unstructured text may sometimes be used to refer to a sports team based in Chicago, such as the Chicago Bulls basketball team, rather than the city Chicago. In such cases, if it is determined that the unstructured text relates to basketball, instances of "Chicago" in the text can be identified as corresponding to an entity Chicago Bulls in a knowledge database, rather than the entity Chicago, Ill.

Once named entity resolution has been performed, further processing of output text data representative of an output of the named entity resolution can be performed, for a variety of purposes. For example, relationships expressed by the text represented by the output text data can be extracted or a sentiment expressed by the text may be identified. This data may be used to further enrich a knowledge database such as a knowledge database used to construct the subject entity data set (as will be described further below). Alternatively, or in addition, the named entity resolution process may allow data associated with the correct entity to be obtained from a knowledge database, for example to answer a question asked by a user or to display information to a user. Examples of these uses, as well as other uses of unstructured text data that has undergone named entity resolution in accordance with the examples described herein, are described further below.

FIG. 1 shows schematically an example system for processing unstructured text data using a subject entity data set, which for example corresponds with the first look-up table referred to above. The system of FIG. 1 for example allows named entity resolution of unstructured text data to be performed. As will be appreciated, the system of FIG. 1 is merely illustrative; the methods described herein may be applied using a number of different devices and computer systems, including, for example, general-purpose computing systems, server-client computing systems, mainframe computing systems, telephone computing systems, laptop computers, cellular phones, personal digital assistants (PDAs), tablet computers or other mobile devices.

A user can select unstructured text data for processing via the computer device 100 of FIG. 1. The computer device 100 is for example any device with computational capability such as a laptop or personal computer; a mobile or a cellular phone, such as a smartphone; or a speech-controlled appliance. A user can use the computer device 100 to access a document stored on the first server device 102, such as a webpage, via the network 104, for example using hypertext transfer protocol (HTTP) or other network requests. As the skilled person will understand, a webpage is for example a document that may be displayed via a web browser. A webpage may be written in a markup language such as hypertext markup language (HTML). Thus, webpage data representative of the webpage may be in such a markup language. For example, such webpage data may be representative of text of the webpage and may also be representative of other features of the webpage, such as features that relate to how the webpage is to be displayed in a web browser.

The computer device 100 may include a web browser application or software, which may be used to access the webpage. The webpage for example relates to a particular subject, such as a topic or theme or a primary or main concept, such as a person, location, object or concept, which may be real or fictional. For example, the webpage may be a page of an online content encyclopedia relating to a given entry of the encyclopedia, such as a Wikipedia page, or the webpage may include or summarize information or reviews relating to a particular work. For example, the webpage may be an Internet Movie Database (IMDb) page relating to a particular movie, television series or actor. In this way, the user can receive unstructured text data representative of unstructured text, such as the text of a webpage. Receiving data for example may refer to any instance of accessing data for processing and may involve the transfer of data from a remote device or system to the computer device 100 or the transfer of data within one or more internal components or subsystems of the computer device 100 such as a memory of the computer device 100. In other cases, data may be considered to be received where it is merely accessed by a processor, such as a processor of the computer device 100, for processing, for example from a memory or other data store. For example, data may be generated or derived from other data, such as metadata, stored by the computer device 100.

Subject data, which is indicative of the subject of the unstructured text, may be received by the computer device 100. In response to the subject data, a subject entity data set may be selected from a plurality of data sets 106 using a data set selection module 108 of the computer device 100. In this example, the selection of the subject entity data set involves selecting, from a plurality of look-up tables and based on the subject data, a first look-up table which corresponds to the subject of the unstructured text. The subject entity data set may for example be considered to be a dictionary of words or text which share some characteristic (in this case the characteristic that each of the entities of the subject entity data set is related to the subject entity or is itself the subject entity) as well as a mapping between the words or text and the entity associated with the relevant word or text. The mapping may be a virtual mapping in that there may not be specific mapping data that is indicative of a mapping. Instead, the mapping may be indicated by the structure or format in which the subject entity data set is stored, such that text is associated with a particular entity by virtue of the relative position or location of text data representative of the text and entity data representative of the entity.

The data set selection module 108 in this example is shown as module of a natural language understanding module 110 of the computer device 100. A module is for example illustrated schematically in the FIGS. to represent a function to be performed by the computer device 100. A module may be implemented in hardware, software or a combination of hardware and software, and may be implemented using multiple separate components of the computer device 100. However, in other examples, modules such as those illustrated in FIG. 1 may be separate or may be located on other components of the system than the computer device 100. Furthermore, the computer device 100 may include additional components or modules not shown in FIG. 1. An example structure of the computer device 100 of FIG. 1 is described further below with reference to FIG. 13.

In this example, the plurality of data sets 106 are stored on a second server device 112, which, like the first server device 102 is coupled to the computer device 100 via the network 104. In other examples, though, the computing device 100, the first server device 102 or a further device such as a further computing device may include the plurality of data sets 106.

The computer device 100 need not be immediately or directly coupled to the first and second server devices 102, 112 but may instead be coupled via one or more intermediate components. The network 104 is for example any suitable data network, for example a computer network such as the Internet, a local area network, a wide area network, a telecommunications network, a wired network, a wireless network, or some other type of network.

In this example, a speech controlled appliance 113 is also coupled to the computer device 100 via the network 104. The speech controlled appliance 113 is for example arranged to capture a spoken utterance of a user via an audio capture device such as a microphone or a microphone array. The speech controlled appliance 113 may also include at least one speaker, for example for providing audio output for responding to a user in response to the user's utterance, for example based on NLU of the user's utterance, to provide an appropriate response to the user's utterance, such as an answer to a question asked by the user. In other examples, the computer device 100 may be a speech controlled appliance such as the speech controlled appliance 113, or the functions of the speech controlled appliance 113 and the computer device 100 may be combined in one device.

After receiving the subject entity data set from the second server device 112, for example via the network 104, the computer device 100 can perform named entity resolution of the unstructured text received from the first server device 102. The output of the named entity resolution process may be used in a variety of different ways, some of which are described further below with reference to FIGS. 8 to 12.

An example subject entity data set 114 is illustrated schematically in FIG. 2. The subject entity data set 114 of FIG. 2 includes a first column 116 and a second column 118. The first column 116 includes a plurality of related entities 120*a* to 120*i* represented by entity data. Although not illustrated in FIG. 2, it is to be understood that the entity data may represent or indicate a location of the entity (or a node or other structural component) within a knowledge database used for generating the subject entity data set 114. For example, the entity data may represent the knowledge database identifier for a corresponding entity, allowing the entity to be located within the knowledge database. Thus, the entity data may also allow data associated with the entity within the knowledge database to be located and retrieved from the knowledge database, for example where such data is also associated with the same or a corresponding location in the knowledge database as the entity.

Each of these entities is related to the subject entity, which in this example is the entity George Springate. Related entities may for example be considered related to the subject entity in that they participate in a particular relationship with the subject entity, for example a subject-predicate-object relationship, such that together the related entity, the relationship and the subject entity may form a complete sentence, or a sentence that makes grammatical sense. For example, a related entity may be an instance of the subject entity, although this is merely an illustrative example and other relationships are possible.

In the example of FIG. 2, the subject entity data set 114 also includes the subject entity 120*j*, George Springate. Thus, the entity data includes related entity data representative of related entities related to the subject entity as well as subject entity data that is representative of the subject entity 120*j* itself. However, in other examples, the subject entity data set may not include subject entity data representative of the subject entity.

Generation of the subject entity data set 114 of FIG. 2 is described further below with reference to FIGS. 14 and 15.

The second column 118 includes text 122*a* to 122*m* associated with the entities of the first column 116. This text 122*a* to 122*m* is represented by text data. In the example of FIG. 2, the first column 116 includes a first column heading 124, "Entity" and the second column 118 includes a second column heading 126, "Associated Text". However, the subject entity data set 114 of FIG. 2 is merely an example and column headings may be absent in other subject entity data sets. Moreover, the structure of other subject entity data sets may be different from that of FIG. 2.

In the example of FIG. 2, the entity data and the text data is stored in the subject entity data set 114 so as to indicate an association between entities and respective text associated with each entity. In this case, the subject entity data set 114 is stored within a data structure, which in this example is a look-up table. Thus, in this example, this association is indicated by an entity being located in the same row of the look-up table as the text associated with the entity. For example, first related entity data representative of a first related entity 120*a* related to the subject entity is stored in a first row of the look-up table and first text data associated with the first related entity 120*a*, which is representative of first text data 122*a*, is also stored in the first row. Similarly, second entity data representative of a second related entity 120*b* related to the subject entity and second text data representative of second text data associated with the second related entity 120*b* are both stored in a second row of the look-up table. Typically, the subject entity data set includes entity data for a plurality of different related entities related to the subject entity, and the associated text data representative of text associated with each of these related entities. However, this is not particularly limiting and, in some cases, the subject entity data set may include the first related entity data and the first text data without including related entity data and text data for other related entities related to the subject entity. As will be appreciated, the particular way in which the related entity data and the text data are associated with each other by the structure of the look-up table or the subject entity data set is not particularly limiting and may be different than that shown in FIG. 2 in other examples.

For the first related entity 120*a* and the second related entity 120*b*, there is a one-to-one mapping or association between the first related entity 120*a* and the first text 122*a* and between the second related entity 120*b* and the second text 122*b*. However, in other examples, there may be a one-to-many mapping or association between an entity and text associated with the entity. This is shown by the third related entity 120*c* in FIG. 2. In this example, the third related entity 120*c* is represented by third related entity data stored in a third row of the look-up table. However, the third related entity 120*c* is associated with third text 122*c* and fourth text 122*d*, which are stored in a first sub-row of the third row and a second sub-row of the third row, respectively. This example illustrates that, in some cases, entity data representative of a particular entity may be associated with a plurality of text data representative of a plurality of different text, such as a plurality of different terms, words or strings.

As will be appreciated by the skilled person, in other examples, the subject entity data set may be stored in a different data structure or format than a look-up table. For example, the subject entity data set may be stored in the form of a hash table or hash map or as a B-tree, although other structures are possible in other examples. As the skilled person will appreciate, a hash table is for example a data structure that allows keys to be mapped to values, typically in a computationally efficient manner. A B-tree is for example a tree data structure for organizing data efficiently.

In some examples, the subject entity data set may include association data representative of an association between the first related entity data and the first text data, rather than the association being indicated by a structure in which the first related entity data and the first text data are stored. For example, the association data may be metadata associated with the first related entity data that indicates that the first text data is associated with the first related entity data. Similarly, the first text data itself may alternatively be metadata associated with the first related entity data and indicating the association between the first related entity data and the first text data.

An example output 128 of named entity resolution according to examples described herein, which may be obtained using the example subject entity data set 114 of FIG. 2, is shown schematically in FIG. 3. The unstructured text data of FIG. 3, which represents the unstructured text 130 "George Springate attended McGill University, which is a public research university located in Montreal, Canada", has been processed using first text data representative of first text ("McGill"), which is associated with a first entity (McGill University) to identify a first portion 132 of the unstructured text data that corresponds to the first text data. The unstructured text data of FIG. 3 has been further processed using second text data representative of second text ("Montreal"), which is associated with a second entity (Montreal Quebec) to identify a second portion 134 of the unstructured text data that corresponds to the second text data. The unstructured text data, the first text data and the second text data may each be in the form of strings, which is typically a sequence or series of characters. A string is generally considered to be a data type, which may be implemented using an array data structure, with elements of the array storing characters of the sequence of characters corresponding to the string. For example, the processing the unstructured text data may include searching the unstructured text for at least one of a string or a substring that matches the first text or the second text. Searching such as this may involve a string matching technique such as a greedy string matching process, in which the longest-matching substring, for example the longest-matching series of characters, in a sentence (which may correspond to a complete word or partial or incomplete word of the sentence for example) is identified as corresponding to the text data being matched. In other examples, though, such a string matching process may involve selecting or identifying a predetermined number of words or sentences around or surrounding the longest-matching substring in the unstructured text, or selecting the paragraph including the longest-matching substring, as the first portion or the second portion of the unstructured text data.

In other examples, though, other techniques may be used to identify portions of the unstructured text corresponding to the text data, as the skilled person will appreciate. For example, where the unstructured text data includes feature vectors representative of respective words of the unstructured text (as will be described further below), the relevant portions of the unstructured text data may be identified as corresponding to the text data of the subject entity data set 114 based on a comparison between the feature vectors of the words of the unstructured text with feature vectors corresponding to respective text data of the subject entity data set 114. For example, a cosine distance or a mean squared error between a feature vector of a word of the unstructured text and a feature vector corresponding to text data of the subject entity data set 114 may be calculated to determine whether a particular word of the unstructured text corresponds to the text data of the subject entity data set 114.

Using the first text data, the first portion 132 of the unstructured text data can be identified, from the subject entity data set, as corresponding to the first related entity data. Similarly, using the second text data, the second portion 134 of the unstructured text data can be identified, from the subject entity data set, as corresponding to the second related entity data. In this example, this may be performed by looking up the first text data and the second text data in the first look-up table and determining which entity is related to the first text data and the second text data in the first look-up table, respectively. As will be appreciated, this may be performed either before or after the first portion 132 and the second portion 134 of the unstructured text data are identified. For example, a single look-up operation may be performed in which both the first text data and the first related entity data associated with the first text data (and similarly for the second text data) are obtained from the first look-up table. The output of this identifying is for example output text data, as described further below. As will be appreciated, this mapping between the first and second text data and the first and second related entities may be performed differently in different examples. For example, where the subject entity data set includes association data, this mapping may be performed by processing of the association data (such as processing of metadata where the association data is in the form of metadata).

Based on identification of first and second related entities in the unstructured text, a fact triple 136 can be obtained, which in this example is in the form predicate (subject, object). In this example, the predicate or relationship between the subject and object has been identified as located in, the subject is McGill University (the first related entity) and the object is Montreal Quebec (the second related entity). For example, the fact triple 136 may be obtained by identifying a semantic relationship between the first and second related entities. Such a semantic relationship may be identified by identifying one or more intervening words between the first text and the second text, such as one or more intervening words that satisfy certain semantic or other criteria. For example, the unstructured text may be analyzed to identify words between the first and second text that have been identified as corresponding to a particular part of speech, or that have been identified as corresponding to a particular pre-defined relationship (such as located in for example). The one or more intervening words, which may be represented by a further portion of the unstructured text data, may then be taken as the predicate in the fact triple 136. Further examples of obtaining a fact triple such as this are described further below with reference to FIGS. 6 and 7.

A method according to examples for identifying first and second portions of unstructured text data as corresponding to first and second related entity data, respectively, is now described with reference to FIGS. 4 and 5.

Figure 4:
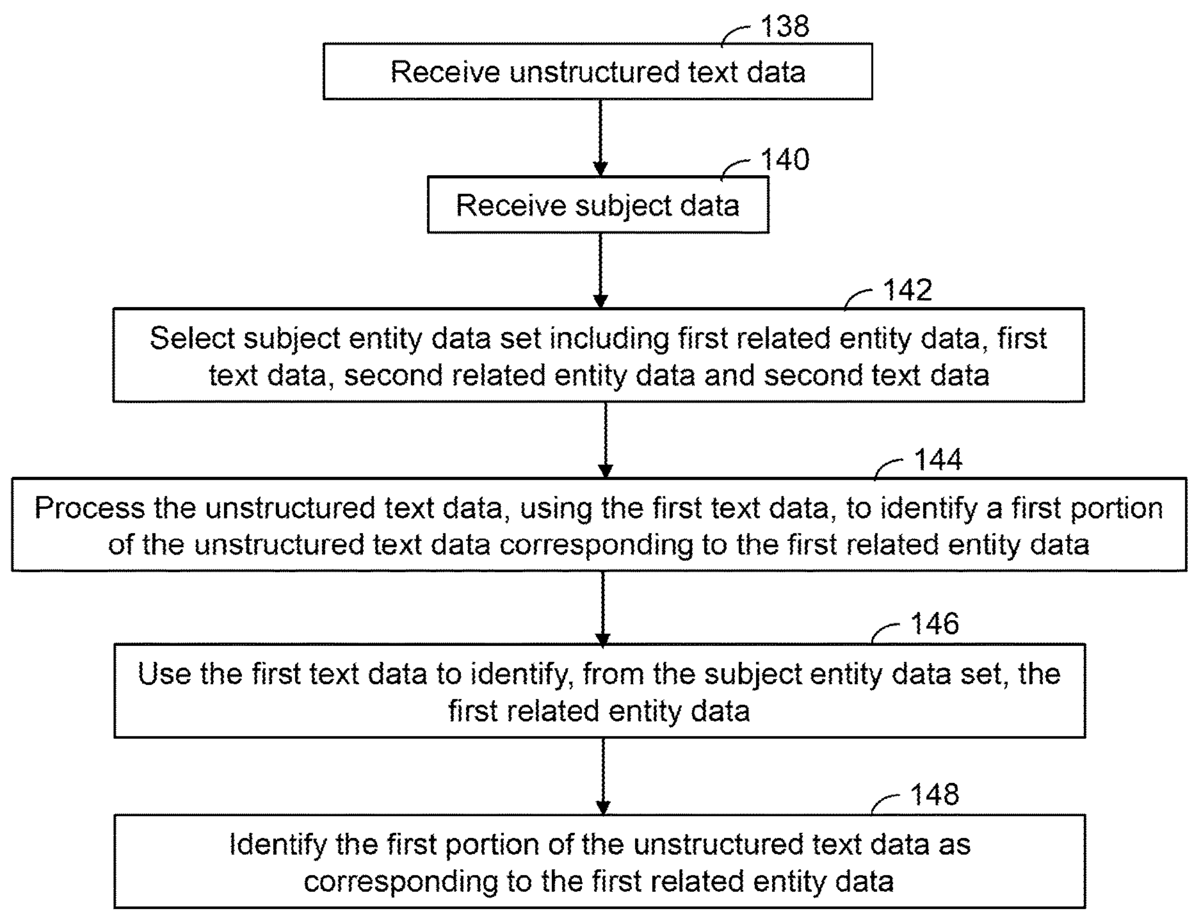
FIG. 4 is a flow diagram illustrating a use of a subject entity data set according to examples.

At block 138 of FIG. 4, unstructured text data is received. The unstructured text data is representative of unstructured text, such as text of a webpage or document as described above. The unstructured text data may be in any suitable format for representing text.

Either before or (typically) after block 138 of FIG. 4, the unstructured text data may be processed to simplify further processing by a computer device. For example, the unstructured text data may be tokenized, which typically involves dividing or splitting the unstructured text into words, with each word typically separated from each other word with a blank or empty space. The unstructured text data may also be processed to tag parts of speech present in the unstructured text. Tagging of parts of speech may for example involve assigning parts of speech or other NLP features, for example nouns, verbs, adjectives, or finer-grained tags such as noun-plurals or noun-singulars, to each word of the unstructured text. This may for example be referred to as grammatical tagging or word-category disambiguation. Subsequently, the unstructured text data may be processed to identify noun-phrases (sometimes abbreviated to "NPs"), which are phrases that have a noun as a head word, where a head word typically determines the syntactic category of that phrase, or phrases that perform the same grammatical function as this. In further examples, syntactic parsing of the unstructured text data may be performed. This typically allows unstructured text to be divided into constituents, such as words or phrases. This may result in a parse tree indicating the syntactic relationship between different constituents of the text.

At block 140 of FIG. 4, subject data indicative of a subject entity is received. The subject data is for example indicative of a subject of the unstructured text. In other words, the subject entity may correspond with the subject of the unstructured text. The subject entity for example corresponds with an entity of a knowledge database from which the subject entity data set is derived, as will be described further below.

In this example, the subject data is generated based on a uniform resource identifier (URI) of a document to be accessed, for example by the computing device 100 of the user. Thus, in the example of FIG. 4, the subject data is received internally within the computing device 100 after generation based on the URI, rather than being received from an external device or server. As described above with reference to FIG. 1, though, in other examples, the subject data may be received from a different device or server than the computing device 100 of the user.

In FIG. 1, the document is a webpage. Hence, the uniform resource identifier is a uniform resource locator (URL) of the webpage in this example. For example, the URL may be processed to identify a file name the URL points to, which may be further processed to identify the subject the file name relates to. The URL may therefore be processed to identify a portion of the URL that corresponds to the subject entity. In these examples, the subject data may be representative of the portion of the URL that corresponds to the subject entity. For example, where the method is used to process webpages from a particular source or domain, with a particular URL structure, the portion of the URL that identifies the subject of the webpage may be readily extracted. In some cases, the portion of the URL that relates to the subject may directly correspond with subject text that is associated with or that describes the subject entity. However, in other cases, this portion of the URL may require further processing to retrieve or generate the subject data. For example, this portion of the URL may correspond to, or may be processed to obtain, the identifier of the subject entity within a knowledge database. In these cases, the subject entity data related to the subject entity may be accessed from the knowledge database. Then, subject text associated with the subject entity may be obtained from the knowledge database. In such cases, the subject text may be represented by subject text data, which may be transferred to the computer device 100 and used as the subject data in the methods described herein.

In other examples, the subject data may be for example generated or input by a user, for example where a user selects the unstructured text to be analyzed and the user knows that the unstructured text relates to a particular subject. In this case, the user may be able to enter text, for example freeform or unstructured text, using a computer device such as the computer device 100 of FIGS. 1 and 13, to indicate the subject entity, thereby generating the subject data.

In further examples, the unstructured text data itself may be processed to generate the subject data. For example, the unstructured text data may be processed to determine the most frequent noun or noun-phrase or the most important word in the unstructured text, for example using suitable information retrieval techniques that would be known to the skilled person. This text may then be identified as corresponding to the subject of the unstructured text and stored as the subject data.

At block 142 of FIG. 4, a subject entity data set is selected. The subject entity data set is selected from a plurality of data sets and based on the subject data. For example, where the subject data represents a particular subject or subject entity, the subject entity data set may include appropriate data, for example subject metadata, that allows the subject entity data set to be identified as corresponding to the subject of the subject data. As noted above, the subject entity data set may for example correspond with a first look-up table, selected from a plurality of look-up tables, the first look-up table including first look-up table data.

The subject entity data set includes first related entity representative of a first related entity related to the subject data and first text data representative of first text associated with the first related entity. Further details of the first related entity data and the first text data are given below with reference to FIG. 11.

At block 144 of FIG. 4, the unstructured text data is processed, using the first text data, to identify a portion of the unstructured text data corresponding to the first text data. As described above with reference to FIG. 3, this may involve a string matching process or technique.

At block 146 of FIG. 4, the first text data is used to identify, from the subject entity data set, the first related entity data. As described above with reference to FIG. 3, this may be performed by looking up the first text data in the subject entity data set, determining which entity is associated with the first text data and identifying this entity as the first related entity. For example, the first related entity data may represent, indicate or point to a portion of the knowledge database (such as a node if the knowledge database is stored in the form of a graph) corresponding to the first related entity. For example, the first related entity data may represent a knowledge database identifier corresponding to a particular node of the knowledge database, and allowing that node to be located and/or retrieved from the knowledge database.

At block 148 of FIG. 4, the first portion of the unstructured text data is identified as corresponding to the first related entity data. For example, the first portion of the unstructured text data may be annotated or tagged as corresponding to the first related entity data. Annotating the first portion of the unstructured text data may for example involve generating annotated text data representing an annotated version of the unstructured text. For example, in the annotated version of the unstructured text, each word of the unstructured text may be listed alongside an annotation, tag or flag, which indicates what the respective word has been annotated as, and the annotated text data may represent this annotated version of the unstructured text. The annotation may for example be syntactically distinguishable from the unstructured text that is to be annotated. For example, the annotated text data may represent a marked-up version of the unstructured text, with the mark-up indicating words or phrases of the unstructured text that have been identified as corresponding with an entity related to the subject entity, such as a related entity from a knowledge database. The annotation may also or alternatively include an indication of a knowledge database or other identifier represented by the first related entity data, for example. The annotated version of the unstructured text may also include annotations, tags or flags indicating or representing other features of the unstructured text, such as the parts of speech that each word has been tagged with. Annotating the first portion of the unstructured text data in this way may for example involve annotating the first portion of the unstructured text data with first annotation data, which for example represents a first annotation, such as a first symbol, character or combination of symbols or characters, indicating that the first portion of the unstructured text data corresponds to the first related entity data. In some examples, though, the annotating the unstructured text data may involve replacing words of the unstructured text that have been identified as corresponding to the first related entity with an annotation (for example represented by annotation data) rather than adding an annotation to the unstructured text.

In other examples, though, the identifying the first portion of the unstructured text data as corresponding to the first related entity data may involve generating first output data, such as first metadata, indicating that the first portion of the unstructured text data corresponds to the first related entity data. First metadata such as this may be stored as part of the same file or associated with the same file or data structure as the unstructured text data, and may be considered to correspond to annotated text data (either alone or in combination with the unstructured text data itself).

However, in yet further examples, the identifying the first portion of the unstructured text data as corresponding to the first related entity data may involve generating first output data that may be stored separately from the unstructured text, such as in a separate file. For example, the unstructured text data may be stored in a first file and the first output data may be stored in a second file different from the first file. For example, the generating of the first output data may involve generating a list of words (for example represented as strings) identified from the unstructured text data as corresponding to the first related entity data, and storing this list of words in a separate file (or as metadata associated with the unstructured text data), for example along with annotations or other indications representative of characteristics of these words, such as the relative position of each of these words in the unstructured text. For example, the first output data may be representative of both the first text and a position of the first text within the unstructured text. For example, the first data may include an indication that the words represented by the first portion of the unstructured text data correspond to words 13 to 16 of the unstructured text. For example, each word in this list may be marked-up with an appropriate symbol or combination of symbols or characters to indicate the related entity of the knowledge database that the respective word has been identified as corresponding to, as well as further mark-up indicating other features of the word, such as the part-of-speech the word corresponds to in the unstructured text. In these yet further examples, the data stored in the separate file may itself be considered to correspond to the annotated text data.

It is to be appreciated that the order of the actions of FIG. 4 is merely illustrative and that in some examples these actions may be carried out in a different order. For example, the subject entity data set may be selected based on the subject data. Subsequently, the first text data and the first related entity data may be obtained from the subject entity data set, for example by querying a first look-up table storing the subject entity data set as first look-up table data. After this, the unstructured text data may be processed using the first data to identify the first portion of the unstructured text data corresponding to the first related entity data, for example using a string matching technique. In other words, the actions of block 146 may occur before the actions of block 144, for example.

Typically, the unstructured text data is processed to identify more than one different related entity related to the subject entity. FIG. 5 is a flow diagram illustrating further processing that may be applied to the unstructured text data after identifying the first portion of the unstructured text data as corresponding to the first related entity data. In the example of FIG. 5, the subject entity data set includes, in addition to the first related entity data and the first text data, second related entity data representative of a second related entity related to the subject entity and second text data representative of second text associated with the second related entity.

Figure 5:
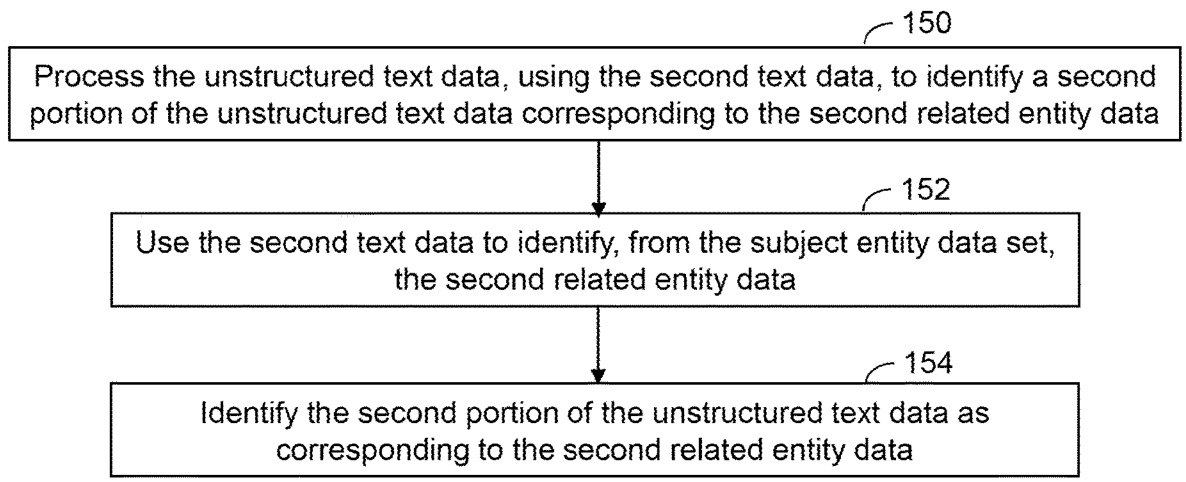
FIG. 5 is a flow diagram illustrating a further use of a subject entity data set according to examples.

At block 150 of FIG. 5, the unstructured text data is processed, using the second text data, to identify a second portion of the unstructured text data corresponding to the second related entity. This processing may be similar to that for identifying the first portion of the unstructured text data but using the second text data rather than the first text data.

At block 152 of FIG. 5, the second text data is used to identify, from the subject entity data set, the second related entity data, similarly to the use of the first text data at block 146 of FIG. 4 to identify the first related entity data from the subject entity data set.

At block 154 of FIG. 5, the second portion of the unstructured text data is identified as corresponding to the second related entity data. The identifying the second portion of the unstructured text data as corresponding to the second related entity data may for example be similar to the identifying the first portion of the unstructured text data as corresponding to the first related entity data, as described with reference to block 148 of FIG. 4.

Figure 6:
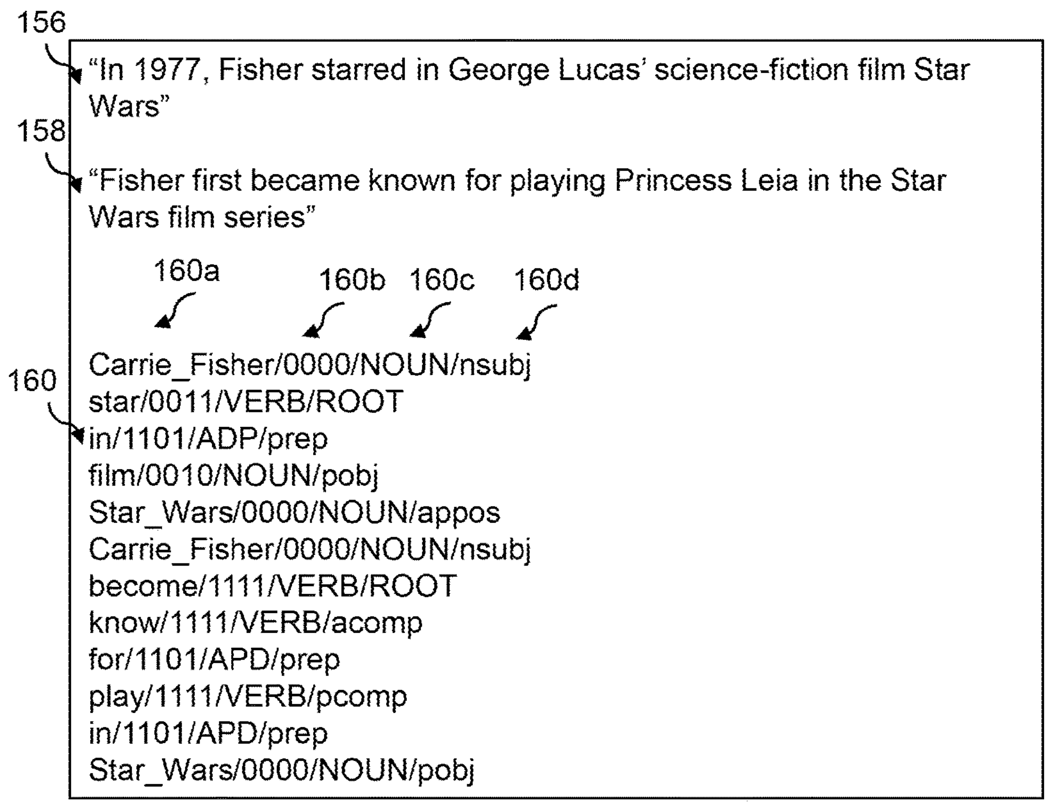
FIG. 6 illustrates schematically an example of annotation of unstructured text according to examples.

An example output of the identifying of FIGS. 4 and 5 is shown schematically in FIG. 6. FIG. 6 illustrates a first and a second sentence 156, 158, each relating to the first entity Carrie Fisher and the second entity Star Wars. After identifying instances of the first and second related entities in the first and second sentences 156, 158 using the methods of FIGS. 4 and 5, annotated text 160 is obtained. The annotated text 160 in this example represents the unstructured text of the first and second sentences 156, 158 but with the instances of the first entity Carrie Fisher replaced with a first annotation Carrie_Fisher (which for example corresponds with first annotation data) and instances of the second entity Star Wars replaced with a second annotation Star_Wars (which for example corresponds with second annotation data). As can be seen, in this example, the words of the first and second sentences 156, 158 after annotating are listed out, along with tags indicating the part of speech they correspond to (such as NOUN, VERB etc.). In the example of FIG. 6, words of the annotated text 160 are represented by four features, separated by forward slashes: a lemma 160*a* (which is for example a dictionary or canonical form of the word or a pre-defined replacement or annotation associated with a particular word), a Brown cluster identifier (ID) 160*b* (which for example indicates a location of the word in a particular space, with similar words having similar Brown cluster identifiers after undergoing Brown clustering, as the skilled person will appreciate), a part-of-speech tag 160*c* and a dependency parser tag 160*d* (which for example indicates how the word modifies or is related to other words of the unstructured text, grammatically). However, this is merely illustrative. In other examples, the annotated text may include other features or characteristics that are descriptive or representative of features of the text, such as grammatical or syntactical features. These sentences after annotating may for example be represented by annotated text data. In this example, the annotated text data is in the form of a series of strings, with each string representative of a word of the unstructured text and including the four features described above, separated by forward slashes. As explained above, though, this is merely illustrative, and the annotated text data may be stored in a different format in other examples.

Before further processing of the data obtained after the named entity resolution of FIGS. 4 to 6, which may be referred to as output text data, various checks may be performed to verify that the correct parts of the unstructured text have been identified as corresponding to the first and second related entities. Some of these checks are illustrated schematically in the flow diagram of FIG. 7. As will be appreciated, the checks of FIG. 7 are merely examples and some or all of these checks may be omitted.

Figure 7:
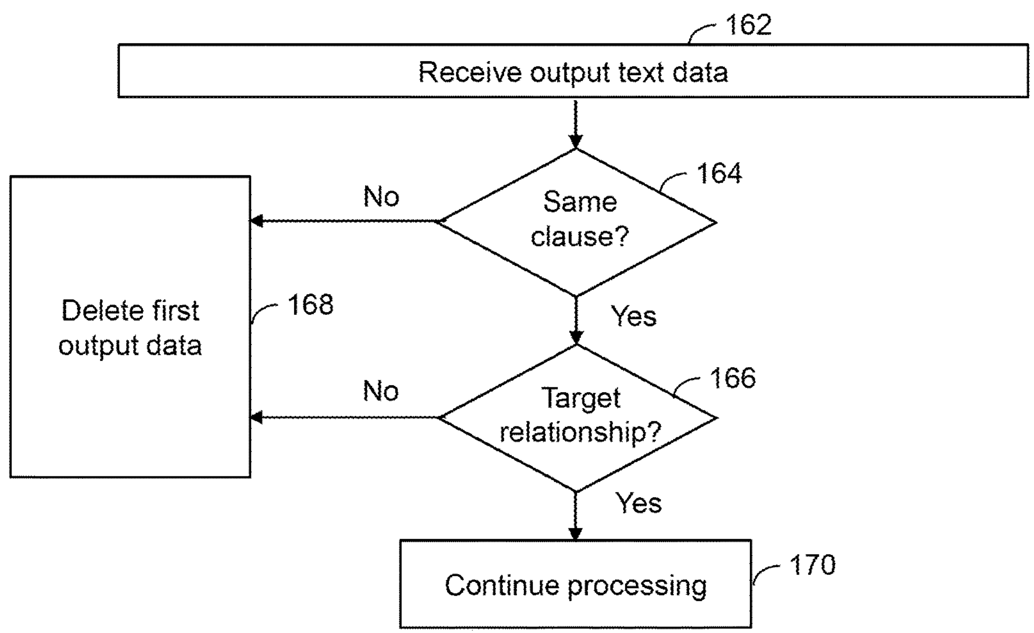
FIG. 7 is a flow diagram illustrating a further example use of a subject entity data set.

At block 162 of FIG. 7, the output text data is received. As will be appreciated, the output text data may for example be generated using the methods described herein, for example with reference to FIGS. 4 and 5. In this example, the output text data includes first output data representative of the first text and a position of the first text within the unstructured text. At block 164, the output text data is processed with the unstructured text data to determine that the first portion of the unstructured text data and the second portion of the unstructured text data each represent text in the same clause of the unstructured text, for example in the same sentence or part of a sentence. This typically indicates that the clause may indicate a relationship between the first and second related entities, and that the clause may therefore be useful for extracting such a relationship. A clause is for example the smallest grammatical unit that can express a complete proposition, although a clause may not contain a complete thought. For example, a sentence may include a plurality of clauses, such as at least one subordinate clause. However, in other examples, a clause may act as sentence on its own, in which case it may be referred to as an independent clause. Typically, a clause includes a subject and a predicate and may also include an object. In examples in which it is not desired to extract a relationship between the first and second related entities, this processing may be omitted. Furthermore, in some cases, this determination may be made based on processing of the unstructured text data itself, without processing of the output text data. For example, during the processing of the unstructured text data to identify the first and second portions, this determination may be performed and no output text data may be generated in cases where it is determined that the first and second portions are in different clauses. In other cases, though, it may be desired to extract relationships between the first and second related entities across a plurality of clauses or sentences. In such cases, the check of block 162 of FIG. 7 may be omitted.

In the example of FIG. 7, if it is determined that the first and second portions are in the same clause, a further check is carried out at block 166. At block 166, first class data representative of a first class of the first related entity is processed to determine whether the first related entity participates in a particular or predetermined relationship, which may be referred to as a target relationship. For example, where the first entity class is a geographical location and the second entity class is a human being, the target relationship may be a birthplace of relation. This processing may involve processing of the first class data with relationship data indicative of the target relationship. The relationship data typically includes first entity class data representative of the first entity class and second entity class data representative of the second entity class. For example, such processing may involve processing the first class data representative of the first class of the first related entity with the relationship data to determine that the first class is of the first entity class. For example, in the above example target relationship, only a geographical location can be the left entity of the birthplace of relation. Thus, if the first related entity is not of the first class geographical location it can be determined that the first and second related entities do not participate in the target relation. This may be considered to correspond to checking that the pair of entities (including the first related entity and the second related entity) satisfy a so-called ontological constraint.

If it is determined that the output text data does not satisfy the checks at block 164 and 166 of FIG. 7, for example if the first class is determined not to be of the first entity class, the first output data representative of the first text and a position of the first text within the unstructured text is deleted, at block 168 of FIG. 7. In such cases, where the first output data is in the form of first metadata, the first metadata may be removed. Similarly, where the first output data represents symbols or characters for providing a marked-up or annotated version of the unstructured text, these symbols or characters may be removed to reverse the annotation process. In cases where the first output data is stored separately, for example as a separate file, the separate file may be deleted or a link or association between the first output data and the unstructured text data may be deleted. However, this deleting (or the checks at blocks 164 and 166) may be omitted in some cases, depending on the intended use of the output text data. For example, where the output text data is intended to be used to identify a relationship between the first related entity and the second related entity one or both of these checks may be performed. However, in other cases, for example where the output text data is to be processed to analyze a sentiment of the unstructured text, one or both of these checks may be omitted. As will be appreciated, a similar check to that of block 166 of FIG. 7 may be carried out to determine whether the second related entity participates in the target relationship and to delete second output data representative of the second text and a position of the second text within the unstructured text if it is determined that the second related entity does not participate in the target relationship.

If it is determined that the output text data does satisfy the checks at blocks 164 and 166 of FIG. 7, further processing may be performed, as indicated by block 170 of FIG. 7. This further processing may include the processing described with reference to FIGS. 8 to 12, for example.

Figure 8:
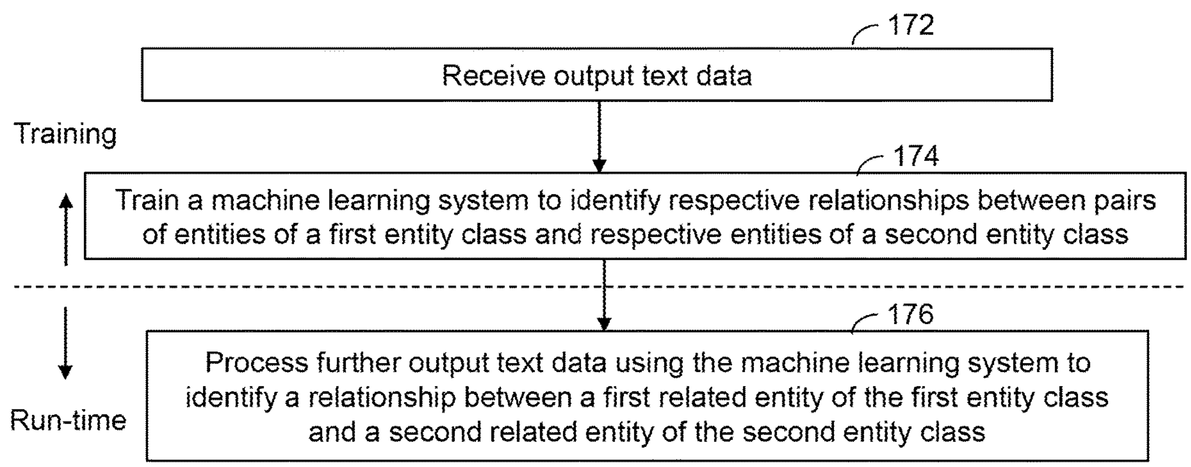
FIG. 8 is a flow diagram illustrating a yet further example use of a subject entity data set.

FIG. 8 provides an example of using the output text data for identifying a relationship between the first related entity and the second related entity. The method of FIG. 8 may for example be performed after the method of FIG. 7 or the method of FIG. 7 may not be performed prior to performing the method of FIG. 8.

FIG. 8 involves a training stage (blocks 172 and 174) followed by a run-time stage (block 176). During the training stage, at block 172, the output text data is received. As will be appreciated, the output text data may for example be generated using the methods described herein, for example with reference to FIGS. 4, 5 and/or 7. At block 172, a machine learning system is trained, using the output text data (either alone or in combination with the unstructured text data, depending on the content of the output text data), to identify respective relationships between pairs of entities of the first entity class (of the first related entity) and respective entities of the second entity class (of the second related entity). Any suitable machine learning system, architecture or classifier may be used. For example, the machine learning system of FIG. 8 may be a neural network such as the fastText classifier, a deep neural network, a support vector machine (SVM). Training of a machine learning system for example involves adaptively updating weights of the machine learning system, which for example govern a mapping from one or more input values to one or more output values, so that the machine learning system is eventually able to more accurately predict the correct output value for a given input value. In this example, the output text data may for example correspond with supervised training data, with the first related entity and the second related entity having been identified using the subject entity data set, and the output text data annotated, tagged or flagged appropriately, for example as described above. In this way, a supervised training process of the machine learning system may be performed, for example using a number of different sentences of text, annotated, tagged or flagged to identify portions of the text corresponding to the first and second related entity, each represented by output text data. In the example of FIG. 8, the machine learning system is trained to identify relationships between pairs of entities of the first entity class and respective entities of the second entity class, for example to predict the correct relationship between a new instance of an entity of the first entity class and a corresponding entity of the second entity class. Typically, the accuracy of the machine learning system in correctly identifying a given relationship may be improved by increasing the size of a training data set for training the machine learning system, where the training set may include output text data representative of a number of different sentences of unstructured text.

At run-time (block 176), for example in which the trained machine learning system is used to process text data which differs from the text data used for the training stage, further output text data may be processed to identify a relationship between a first related entity of the further output text data and a second related entity of the further output text data. At run-time, the weights of the machine learning system may no longer be updated, for example. The further output text data is typically different from the output text data used for training the machine learning system but may nevertheless have a similar structure, with a first portion identified as corresponding to a first related entity of a first entity class and a second portion identified as corresponding to a second related entity of a second entity class.

An example of the use of a machine learning system such as that described with reference to FIG. 8 is shown schematically in FIG. 9. FIG. 9 shows various examples of sentences including first and second related entities. These sentences have been processed using the machine learning system of FIG. 8 to determine that they participate in an instance of relationship between the first related entity and the second related entity. After identifying such a relationship, which may be expressed in the form of a triple, a knowledge database may be enhanced or enriched on the basis of the identified relationship. For example, if a new relationship between existing entities of the knowledge database is identified by the machine learning system, the knowledge database may be updated to include this new relationship. For example, where the knowledge database is in the form of a graph, a new edge may be added to the graph between the nodes corresponding to the entities of the knowledge database that are involved in the new relationship. This new edge may for example correspond to or represent the newly-identified relationship. Similarly, if the machine learning system identifies that an existing entity of the knowledge database is involved in a relationship with a new entity, which is not included in the knowledge database, new entity data (and, in examples, new text data associated with the new entity) may be added to the knowledge database, for example corresponding with a new node where the knowledge database is in the form of a graph. As will be appreciated, the machine learning system may also or alternatively be used to identify relationships between the subject entity and related entities related to the subject entity. In such cases, the identified relationship, which may be in the form of a triple, may be used to enhance or enrich a knowledge database as described above. As a further example, where the processing of the further output text data is in response to a question from a user, an answer may be returned to the user based on the identified relationship, which may be for example between two related entities related to the subject entity or between the subject entity and a related entity.

An alternative example use of output text data is shown in the flow diagram of FIG. 10. At block 178 of FIG. 10, the output text data is received. In this example, the output text data is generated based on identifying the first portion of the unstructured text data as related to the first related entity. In other words, in this example, it is not necessary to also identify a second portion of the unstructured text data as relating to the second related entity. For example, the output text data may be generated using the methods described herein, for example with reference to FIG. 4 and/or FIG. 7.

Block 178 of FIG. 10 is part of a training stage, which also includes block 180, in which a machine learning system is trained to identify a sentiment of text. The machine learning system of FIG. 10 may be similar to that of FIG. 8 but trained for a different purpose. As for the machine learning system of FIG. 8, any suitable machine learning system may be used as the machine learning system of FIG. 10. For example, a neural network such as the fastText classifier, a deep neural network or a SVM may also be used as the machine learning system of FIG. 10, but using different training data and/or a different architecture than for the machine learning system of FIG. 8. As explained above, the training data may for example be output text data that is obtained using the methods described herein. The training of the machine learning system of FIG. 10 may also be similar to the training of the machine learning system of FIG. 10.

At run-time in FIG. 10 (block 182), the further output text data is processed using the machine learning system to identify the sentiment of the further annotated text data. A sentiment is for example whether the text is overall positive, negative or neutral. For example, the determination of a sentiment of a text, sometimes referred to as sentiment analysis or opinion mining, may involve deriving the opinion or attitude of the text. Such analysis may be useful for example to analyze text that includes a review of a product or item or a piece of work such as a movie or book, for example to determine whether the review is positive, negative or neutral.

Figure 11:
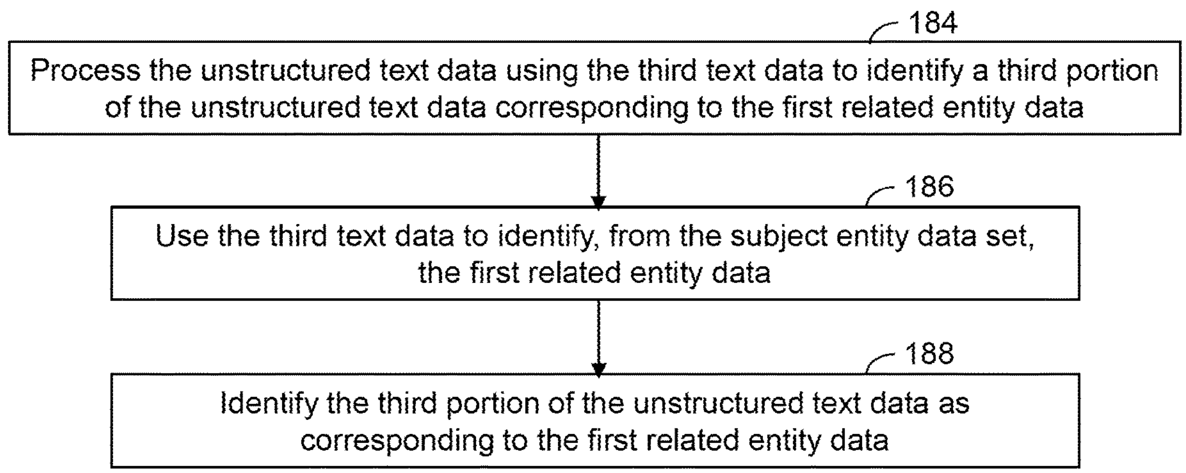
FIG. 11 is a flow diagram illustrating a use of a subject entity data set according to yet further examples.

In the examples given above, there is a one-to-one relationship between the first text and the first related entity. However, in other examples, there may be a plurality of different text that is associated with the first related entity. FIG. 11 relates to such an example. In FIG. 11, the subject entity data set includes third text data representative of third text associated with the first related entity, the third text different from the first text. At block 184 of FIG. 11, the unstructured text data is processed using the third text data to identify a third portion of the unstructured text data corresponding to the third text data. At block 186 of FIG. 11, the third text data is used to identify, from the subject entity data set, the first related entity data. At block 188, the first portion of the unstructured text data is annotated as corresponding to the first related entity data. This may for example involve the generation of the output text data referred to previously. In general, the processing of FIG. 11 is the same as that described for identifying the first portion of the unstructured text data as corresponding to the first related entity, except that the third text data is used instead of the first text data.

Figure 12:
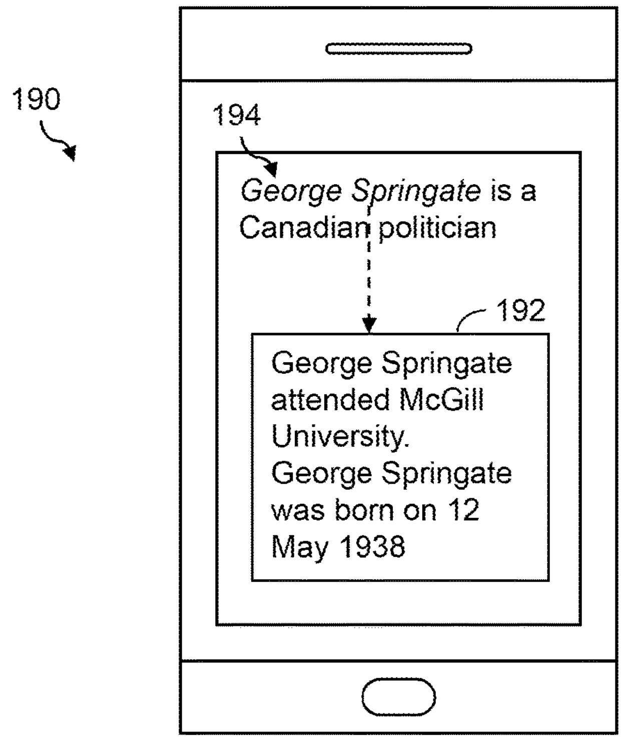
FIG. 12 shows schematically a display device for a use of a subject entity data set according to yet further examples.

FIG. 12 shows schematically a display device 190 for use of a subject entity data set according to yet further examples. The display device 190 may be any display device, such as a liquid crystal display device (LCD device), an electrowetting display device, an electrophoretic display device, a light emitting diode (LED) display device or an organic light emitting diode (OLED) display device coupled to a suitable control system for displaying a desired image, such as an image of text based on text data. The display device 190 may for example be a touchscreen display device. With a touchscreen display device, a user may be able to provide an input or control the display device by touching or interacting directly with the screen of the display device, either using the user's hand or fingers or an implement such as a stylus.

In the example of FIG. 12, fact data representative of at least one fact about the first related entity is retrieved and fact text 192 is displayed using the display device 190. A fact is for example an attribute, quality or characteristic associated with the first related entity and may include features that may be used to describe or provide more detail about the first related entity. Although a fact typically represents true or correct information about the first related entity, in some cases a fact may be merely expected or postulated to be true, and may be proved to be false at a later point in time. The subject entity data set may include the fact data. For example, where the subject entity data set is first look-up table data stored in a first look-up table, the fact data may be stored in an additional column of the first look-up table, so as to be associated with the relevant entity. In other cases, though, the fact data may be retrieved from elsewhere, such as a further look-up table. For example, the fact data may represent text describing the first related entity or providing further information about the first related entity, for example background information regarding the first related entity that a user who is unfamiliar with the first related entity may find useful to put the first related entity into context. The fact data may for example be derived from or based on the database data of the subject entity data set. For example, the fact data may be based on fact triples derived from the database data, and may therefore represent facts related to the first related entity.

The fact text 192 may be displayed in response to a predetermined input received by the display device 190. In the example of FIG. 12, unstructured text 194 represented by the unstructured text data (or by the annotated text data) is displayed using the display device 190 and the fact text 192 is displayed based on a predetermined interaction with the first portion of the unstructured text 194. In this case, the predetermined input corresponds to the user selecting or hovering over the first portion, using an input device such as a touchscreen of the display device 190 or a mouse or other input device coupled to the display device 190. In other cases, though, the predetermined input may correspond to a different predefined gesture.

Figure 13:
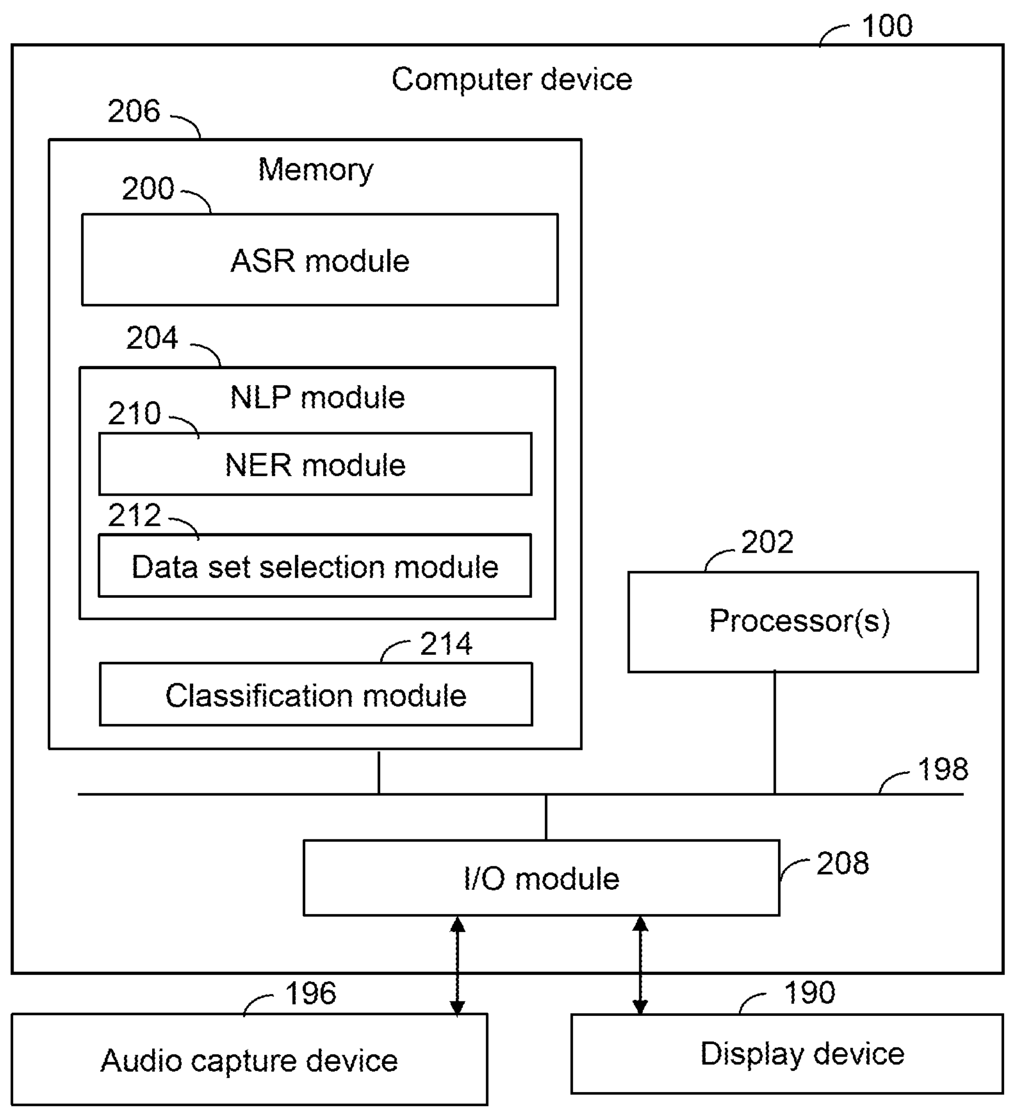
FIG. 13 is a schematic diagram showing internal components of a computer device for use with the example system of FIG. 1.

FIG. 13 illustrates example internal components of the computer device 100 of FIG. 1, which may be used in the examples described above with reference to FIGS. 8 to 12.

Aspects of the methods described herein may include computer-readable and computer-executable instructions that may reside on the computer device 100. FIG. 13 illustrates a number of components that may be included in the computer device 100, however other non-illustrated components may also be included. Also, some of the illustrated components may not be present in every device capable of employing aspects described herein. Further, some components that are illustrated in the computer device 100 as a single component may also appear multiple times in a single device. For example, the computer device may include multiple input/output devices or multiple controllers or processors.

Multiple devices may be employed in a system for performing the methods described herein. In such a multi-device system, the devices may include different components for performing different aspects of the speech processing. The multiple devices may include overlapping components. The computer device 100 as illustrated in FIG. 13 is an example, and may be a stand-alone device or may be included, in whole or in part, as a component of a larger device or system.

The example computer device 100 of FIG. 13 is coupled to a speech controlled appliance such as the speech controlled appliance 113 of FIG. 1, which includes an audio capture device 196 for capturing spoken utterances for processing. The audio capture device 196 may include a microphone or other suitable component for capturing sound. The audio capture device 196 may be integrated into or may be separate from the computer device 100. The computer device 100 may also include an address or data bus 198 for conveying data among components of the computer device 100. Each component within the computer device 100 may also be directly connected to other components in addition to (or instead of) being connected to other components across the bus 198. Although certain components are illustrated in FIG. 13 as directly connected, these connections are illustrative only and other components may be directly connected to each other (such as the automatic speech recognition (ASR module 200) to the controller or processor 202 and/or the NLP module 204).

The computer device 100 may include at least one processor 202 that may be a central processing unit (CPU) for processing data and computer-readable instructions and at least one memory 206 for storing data and instructions. For example, the at least one memory may include computer program instructions, with the at least one memory and the computer program instructions being operable to, with the at least one processor, implement the methods described herein.

The at least one memory 206 may include volatile random access memory (RAM), non-volatile read only memory (ROM), and/or other types of memory. The computer device 100 may also include a data storage component (not illustrated separately in FIG. 13), for storing data and instructions. The data storage component may include one or more storage types such as magnetic storage, optical storage, solid-state storage, etc. The computer device 100 may also be connected to removable or external memory and/or storage (such as a removable memory card, memory key drive, networked storage, etc.) through an input/output module 208. Computer instructions for processing by the at least one processing 202 for operating the computer device 100 and its various components in accordance with the methods described herein may be executed by the at least one processor 202 and stored in the at least one memory 206, storage, external device, or in memory/storage included in the ASR module 200 discussed below. Alternatively, some or all of the executable instructions may be embedded in hardware or firmware in addition to or instead of software. The methods described herein may be implemented in various combinations of software, firmware, and/or hardware, for example.

A variety of input/output device(s) may be coupled to or integrated in the computer device 100 and interfaced to the computer device 100 via the input/output (I/O) module 208. Example input devices include an audio capture device 196, such as a microphone, a touch input device, keyboard, mouse, stylus or other input device. The audio capture device 196 may be integrated in or coupled to a speech controlled appliance such as the speech controlled appliance 113 of FIG. 1. Example output devices include a visual display, tactile display, audio speakers, headphones, printer or other output device. For example, the computer device may be coupled to a display device such as the display device 190 of FIG. 12. The I/O module 208 may also include an interface for an external peripheral device connection such as universal serial bus (USB), FireWire, Thunderbolt or other connection protocol. The I/O module 208 may also include a network connection such as an Ethernet port, modem, etc. The I/O module 208 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the I/O module 208, the computer device 100 may connect to a network, such as the Internet or private network, which may include a distributed computing environment, such as the network 104 illustrated in FIG. 1. For example, the I/O module 208 may include a network interface controller (NIC), sometimes referred to as a network interface card, network adapter or a local area network (LAN) adapter.

The computer device 100 may also include an automatic speech recognition (ASR) module 200 for processing spoken audio data into text. In this way, the computer device 100 may receive an utterance related to the subject entity and may process the utterance using the ASR module 200 using a speech recognition to generate the unstructured text data.

The ASR module 200 transcribes audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 200 which then interprets the utterance based on the similarity between the utterance and models known to the ASR module 200. For example, the ASR module 200 may compare the input audio data with models for sounds (e.g., subword units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Based on the considered factors and the assigned recognition score, the ASR module 200 may output the most likely words recognized in the audio data. The ASR module 200 may also output multiple alternative recognized words in the form of a lattice or an N-best list.

The ASR module 200 may be connected to the bus 198, I/O module 208, audio capture device 196, at least one processor 202, NLP module 204 and/or other components of the computer device 100. Audio data sent to the ASR module 200 may come from the audio capture device 196 or may be received by the I/O module 208, such as audio data captured by a remote entity and sent to the computer device 100 over a network. Audio data may be in the form of a digitized representation of an audio waveform of spoken utterances.

The ASR module 200 includes an echo cancellation filter, an acoustic front end (AFE), a speech recognition engine, and speech storage in examples. The echo cancellation filter for example compares audio that is output by the speaker(s) of the speech controlled appliance 113 with sound picked up by the audio capture device of the speech controlled appliance 113 (or some other microphone used to capture spoken utterances, such as a microphone associated with the computer device 100), and removes the output sound from the captured sound in real time. Echo cancellation is commonly used by cellular telephones and other telephones operating as speaker phones, and facilitates the ASR process by removing a component of captured sounds that can interfere with speech recognition.

The AFE transforms the audio data after echo cancellation into data for processing by the speech recognition engine. The speech recognition engine compares the speech recognition data with the acoustic, language, and other data models and information stored in the speech storage for recognizing the speech contained in the original audio data. The AFE and speech recognition engine may include their own controller(s)/processor(s) and memory or they may use the at least one processor 202 and the at least one memory 206 of the computer device 100, for example. Similarly, the instructions for operating the AFE and speech recognition engine may be located within the ASR module 200, within the at least one memory 206 and/or storage of the computer device 100, or within an external device.

The AFE within the ASR module 200 may divide the digitized audio data into frames, with each frame representing a time interval, for example 10 milliseconds (ms). During that frame the AFE determines a set of values, the feature vector, representing the features/qualities of the utterance portion within the frame. Feature vectors may contain a varying number of values and represent different qualities of the audio data within the frame. Audio qualities of points within a frame may be stored into feature vectors. Feature vectors may be streamed or combined into a matrix that represents a time period of the spoken utterance. These feature vector matrices may then be passed to the speech recognition engine for processing. A number of approaches may be used by the ASR Module 200 and AFE to process the audio data. Such approaches may include using mel-frequency cepstral coefficients (MFCCs), perceptual linear predictive (PLP) techniques, neural network feature vector techniques, linear discriminant analysis, semi-tied covariance matrices, or other approaches known to those of skill in the art.

Processed feature vectors may be output from the ASR module 200 and sent to the I/O module 208 for transmission to another device for further processing. The feature vectors may be encoded and/or compressed prior to transmission.

The speech recognition engine attempts to match received feature vectors to language phonemes and words such as may be known in the storage or the at least one memory 206. The speech recognition engine may compute recognition scores for the feature vectors based on acoustic information and language information. The acoustic information may be used to calculate an acoustic score representing a likelihood that the intended sound represented by a group of feature vectors match a language phoneme. The language information may be used to adjust the acoustic score by considering what sounds and/or words are used in context with each other, thereby improving the likelihood that the ASR module outputs speech results that make sense grammatically.

Following ASR processing, the ASR results may be sent by the ASR module 200 to another component of the computer device 100, such as the at least one processor 202 for further processing (such as execution of a command included in the interpreted text) or to the I/O module 208 for sending to an external device. The ASR module 200 may output processed text or may also output multiple alternative recognized words in the form of a lattice or an N-best list.

ASR results may be sent to a natural language processing (NLP) module 204 for further speech processing. The NLP module 204 may also receive textual input, such as further unstructured text data, from another source, such as the I/O module 208. The NLP module 204 may include a dedicated NLU engine, processor, memory, storage, a named entity recognition (NER) module 210, a data set selection module 212 for selecting a subject entity data set from a plurality of data sets and/or other components, and/or may use components otherwise available on the computer device 100. The NLP module 204 takes unstructured text data representing the textual output of ASR processing or unstructured text received from a further device such as the first server device 102 of FIG. 1 and attempts to make a semantic interpretation of the unstructured text data. That is, the NLP module 204 may determine the meaning behind the unstructured text, for example based on the individual words, and then may execute a command based on the meaning or pass a command to a downstream application for execution. The NLP is based on the models and programming available to the NLP module 204. Such models may be grammar based, rule based, or constructed in a different manner. The NLP module 204 may be configured to tag, annotate or label text as part of NLU processing (as described above).

To correctly perform NLU processing of speech input the NLP module 204 may be configured to communicate with a variety of other components/applications of the computer device 100. Although the NLP module 204 is shown in this example as part of the computer device 100, in other examples, the NLU processing may be performed by a remote device. If performed by a remote device, the remote device may then send instructions to the computer device 100 to perform operations based on the NLU results. In such cases, the remote device may include the NLP module 204.

As explained above, named entity recognition involves processing a sequence of words in unstructured text, recognizing and identifying specific important words, called named entities, and assigning an annotation, tag or label to those words. Named entity resolution involves identifying specific instances of an entity and may also involve annotating, tagging or labelling identified instances, such as instances of the first related entity and the second related entity. Both named entity recognition and named entity resolution may be performed by the NER module 210.

As part of determining what (if any) annotation or tag to apply to each word as part of the named entity recognition process, the NER module 210 may consider textual context information, such as what words come before or after the word being processed, what other words appear in the sentence, etc. These factors to consider in processing, called features, may be indicated to the NER module 210 through feature vectors. Each word in the sequence of words, such as the sequence of words of the unstructured text, may map to a feature vector. The feature vector is a long data structure which indicates what circumstances apply to the particular word. For example, a NLP module 204 may have access to an index of thousands of words that are known to the system. The feature vector may include an entry for all or a subset of the words in the index to indicate whether the selected word of the index is the actual word being processed, whether a word in the index is located in the same sentence as the word being processed, whether a word in the index is directly before or after the word being processed, etc. The information in the feature vector may then influence the named entity recognition processing in its attempt to annotate the text.

A feature vector may include components that are binary features that may be effectively "yes or no" indicators or may include non-binary values. Other information about the text may also be indicated to the NER module 210 through entries in the feature vector. The individual feature vectors for specific words are typically sparse, meaning that only a small subset of the feature vector entries have a non-zero value. The information represented by the feature vector entries are typically defined when training the models used by the NER module 210. When performing NER, the NER module 210 thus may process the feature vector associated with the word, rather than processing the word itself.

Generally, models used for named entity recognition may be trained with feature vectors such as those associated with words during named entity recognition processing, with the feature vectors capturing the word identity as well as other information that may be pertinent to that word (e.g. contextual and other information as mentioned above). Known models that may be used in named entity recognition include maximum entropy models (also known as log-linear models), such as Maximum Entropy Markov Models (MEMMs) or Conditional Random Fields (CRFs). The underlying model may apply weights to certain of the data/feature-components associated with the word and included in the feature vector. The weights may determine the relative importance of each of the feature vector components. Feature vectors weights may be applied during training where the underlying NLU model essentially provides the set of weights that are trained on a certain set of data/words and those weights indicate how important each of those feature vector components are. Thus, the named entity recognition model internally has weight vectors that have the same dimension as the actual feature vectors and when the NER module 210 is predicting the labels during named entity recognition, it may calculate an inner product (or dot product) of the feature vector and the weight vector so that each individual feature of the feature vector is properly weighted.

In examples, after named entity recognition, the NER module 210 performs named entity resolution using the subject entity data set, which is selected as described above, using the data set selection module 212. The output of the named entity resolution may for example be annotated text data, with instances of related entities in the unstructured text that are identified as relating to the subject entity annotated as such.

In examples in which the first portion of the unstructured text data corresponds with a first feature vector and the second portion of the unstructured text data corresponds with a second feature vector, the identifying the first and second portions of the unstructured text data as corresponding to the first related entity data and the second related entity data, respectively, may involve modifying the first and second feature vectors. For example, the first and second feature vectors may each include one or more feature components that indicate within the feature vector whether the first text or the second text represented by the first or second feature vector respectively is represented by entity data of the subject entity data set. Thus, the first or second feature vector may indicate whether the first text or the second text being processed is one of a pre-defined set of words associated with the subject entity data set. In this example, the subject entity data set is one of a plurality of data sets, each corresponding to a different subject entity. For example, different ones of the plurality of data sets will typically include different first data representative of text associated with entities related to different subject entities. However, in some case, text represented by text data may be present in multiple different ones of the plurality of data sets. In general, though, the combination of different text (or different entities related to the subject entity) will be different, for example, unique, for each of the different subject entities.

In the example of FIG. 13, the at least one memory 206 of the computer device 100 also includes a classification module 214 for implementing one or both of the machine learning systems described above with reference to FIGS. 8 and 10. The classification module 214 may therefore be used to extract relationships between two related entities that are identified as being related to a subject entity or to extract the sentiment of the unstructured text represented by the unstructured text data.

The computer device 100 of FIG. 13 is merely an example of a device that may be used for performing the methods described herein. In other examples, the methods described herein may be performed using a system, such as a cloud-computing system, for example a system including the modules of the computer device 100 but distributed over a plurality of different devices. In such examples, one or more of the modules may be a virtual module or may be implemented in a remote location from the computer device 100, such as a remote computer or server device. For example, the at least one memory 206 and the at least one processor 202 may be located remotely from the computer device 100.

Figure 14:
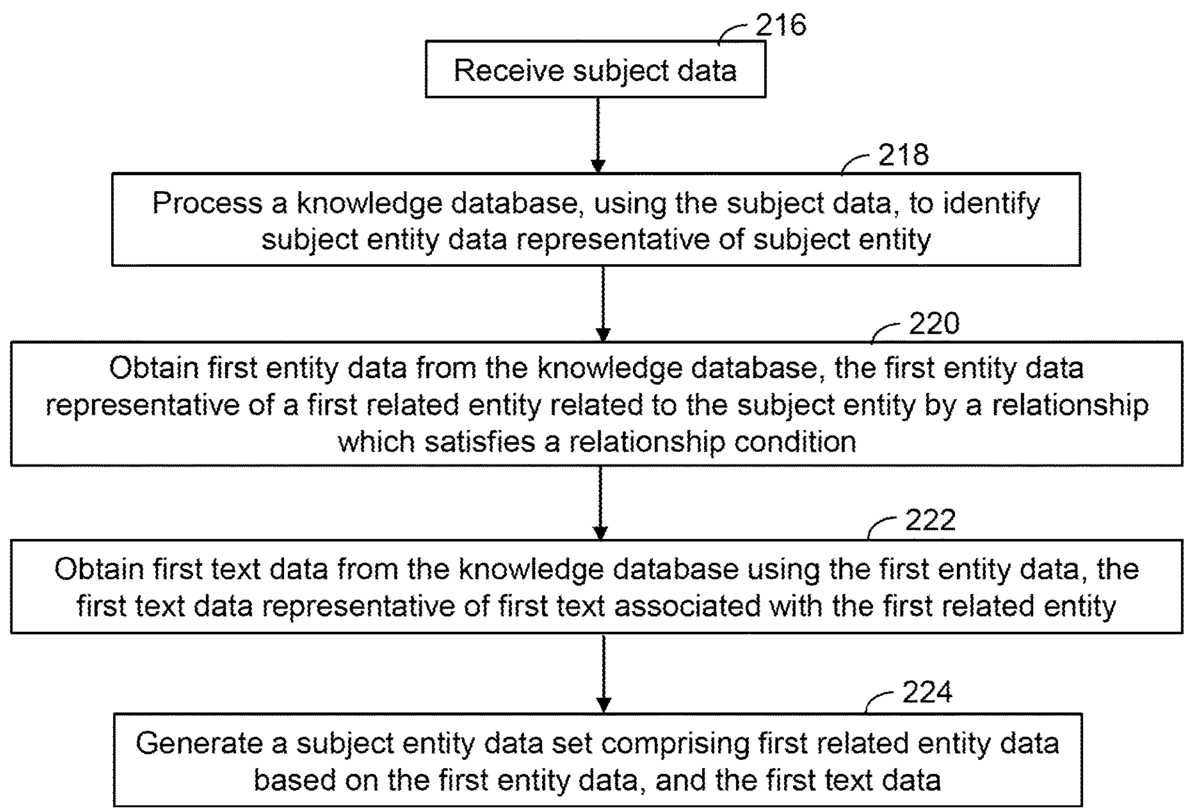
FIG. 14 is a flow diagram showing a method of generating a subject entity data set according to examples.

FIG. 14 is a flow diagram showing schematically an example of generating a subject entity data set. The method of FIG. 14 for example allows a first look-up table to be at least partially filled or populated with first look-up table data, in cases where the first look-up table data corresponds with the subject entity data set.

At block 216 of FIG. 14, subject data indicative of a subject entity is received, for example as described above.

At block 218 of FIG. 14, a knowledge database is processed using the subject data to identify subject entity data representative of a subject entity. The knowledge database is for example an entire or complete knowledge database or a portion of a larger or master knowledge database. The knowledge database may include what may be referred to as database data. In examples, the knowledge database includes entity data representative of a plurality of entities, which typically includes the subject entity data, text data representative of text associated with respective entities of the plurality of entities and relationship data representative of relationships between respective entities of the plurality of entities.

At block 220 of FIG. 14, first entity data is obtained from the knowledge database using the subject data. The first entity data is for example representative of a first related entity related to the subject entity by a relationship which satisfies a relationship condition.

Together, blocks 218 and 220 may be considered to correspond to obtaining first entity data from a knowledge database using the subject data, the first entity data representative of the first related entity related to the subject entity. However, in other examples, this obtaining may involve different processing than that of blocks 218 and 220.

At block 222 of FIG. 14, first text data representative of first text associated with the first related entity is obtained from the knowledge database using the first entity data. For example, the knowledge database may be queried to obtain the first text data, in cases where the text data includes the first text data. In other examples, though, the first text data may be stored in a different data structure or elsewhere than the knowledge database. In such examples, the first text data may be retrieved from this different data structure rather than from the knowledge database.

In examples in which the first entity data corresponds with first related entity data, the first related entity data and the first text data may be stored as first look-up table data in the first look-up table so as to indicate an association between the first related entity data and the first text data. The first related entity data may allow a location corresponding to the first related entity data within the knowledge database to be identified. For example, where the knowledge database is structured as a graph, the first related entity data may represent a knowledge database identifier that corresponds with a particular location of the knowledge database, such as a particular node corresponding to the first related entity.

In examples such as FIG. 14, a subject entity data set may be generated, which includes first related entity data based on the first entity data, and the first text data. For example, the first related entity data may be generated based on processing of the first entity data or may be accessed or retrieved based on the first entity data. In other examples, the first related entity data and the first entity data may be the same as each other.

Further features of the components described with reference to FIG. 14 are now explained with reference to FIG. 15. FIG. 15 shows schematically a portion of a knowledge database 226, such as the knowledge database referred to with reference to FIG. 14. The knowledge database 226 includes a plurality of entities 228, each of which is within an oval box. Not all of the entities of the plurality of entities are labelled in FIG. 15, for clarity. The knowledge database 226 includes entity data which is representative of the plurality of entities 228. The knowledge database 226 in this example also includes relationship data representative of relationships 230 between respective pairs of entities of the plurality of entities 228, which are illustrated in FIG. 15 with arrows. As for the plurality of entities, reference numerals for some of the relationships are omitted in FIG. 15, for clarity.

A relationship between a pair of entities may for example be a direct relationship, with no intervening entities between the pair of entities. Alternatively, a relationship may be an indirect relationship, with one or more entities between the pair of entities. Examples of different types of relationship are discussed further below.

The knowledge database 226 may for example be structured as a graph, with a plurality of nodes and a plurality of edges. In such cases, each entity of the plurality of entities 228 may correspond with a node of the graph and each relationship of the plurality of relationships 230 may correspond with one or more edges. For example, the entity data may be representative of respective nodes of the graph and the relationship data may be representative of respective edges of the graph. For example, a direct relationship between two entities may correspond with one edge between two nodes corresponding to the two entities and an indirect relationship between two entities may correspond with a plurality of edges between the two nodes corresponding to the two entities.

Figure 15:
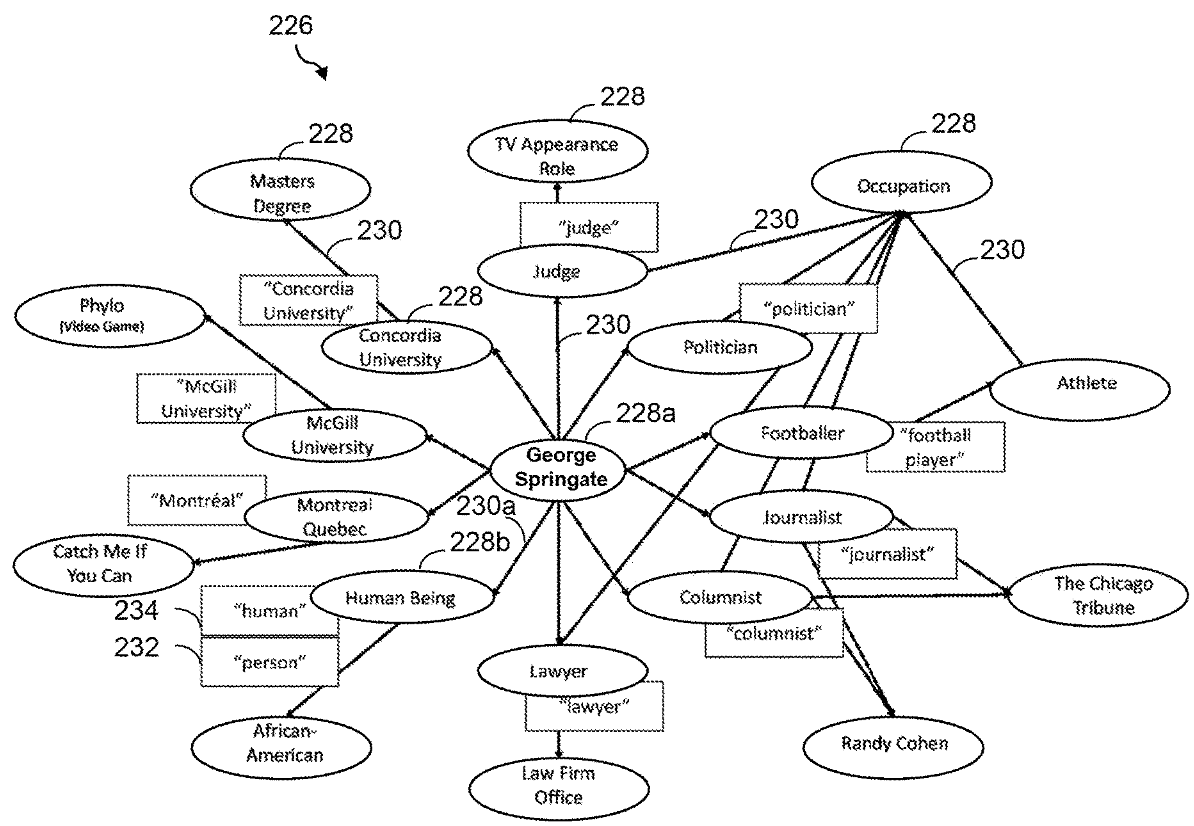
FIG. 15 shows schematically a portion of a knowledge database and illustrates an example of a first related entity and a subject entity satisfying an example relationship condition.

In the example of FIG. 15, the illustrated portion of the knowledge database 226, is a subset of the information contained within the knowledge database 226. This portion of the knowledge database 226 includes the subject entity 228*a*, which in this example is the entity George Springate. To access the relevant portion of the knowledge database 226, the entity data representative of the plurality of entities 228 may be processed, using the subject data, to identify subject entity data representative of the subject entity 228*a*. For example, the subject data may indicate or point to a particular knowledge database 226 identifier, allowing the entity corresponding to this identifier (in this case, the subject entity 228*a*), to be located within the knowledge database 226.

With the subject entity located within the knowledge database 226, first entity data can be obtained from the knowledge database 226 using the subject data, where the first entity data is for example representative of a first related entity 228*b* related to the subject entity 228*a*. As explained above, the first entity data for example represents an identifier of a node of the knowledge database corresponding to the first related entity 228*b*. In the example of FIG. 15, the first related entity 228*b* is the entity human being, although it will be appreciated that this example is merely illustrative.

The first entity data in examples is obtained by processing the entity data and the relationship data to identify that the first related entity 228*b* is related to the subject entity 228*a* by a relationship 230*a* which satisfies a relationship condition. For example, the relationships that the subject entity 228*a* is involved in may each be processed to determine which of these relationships satisfy the relationship condition. For example, where the first related entity 228*b* corresponds with a first node of the graph and the subject entity 228*a* corresponds with a second node of the graph, the edges connecting the first node to the second node may be processed to assess whether any of these edges satisfy the relationship condition. Then, entities on the other end of relationships satisfying the relationship condition may be identified as related entities related to the subject entity 228*a*. For example, nodes connected to the second node (corresponding to the subject entity 228*a*) with respective edges that satisfy the relationship condition may be identified as corresponding to related entities related to the subject entity 228*a*. In examples such as FIG. 15, the knowledge database 226 includes a fact triple including a subject, a predicate and an object. In such cases, the first entity data may represent one of the subject or the object, the subject entity data may represent the other of the subject or the object and the relationship data representative of the relationship may represent the predicate. In FIG. 15, the relationship data represents the relationship is an instance of, the subject is George Springate and the object is human being, which may be expressed as the fact triple: instance of (George Springate, human being).

In the example of FIG. 15, the processing the entity data and the relationship data includes processing the entity data and the relationship data to determine that the subject entity 228*a* and the first related entity 228*b* are directly related and, in response, identifying that the relationship satisfies the relationship condition. In other words, entities that are directly or immediately related to the subject entity 228*a* are determined to be related entities that satisfy the relationship condition. This may be performed by processing the entity data and the relationship data to determine that the graph includes an edge directly connecting the first node (corresponding to the first related entity 228*b*) and the second node (corresponding to the subject entity 228*a*). For example, an edge may be considered to directly connect two nodes where the edge connects these two nodes without connecting with an intervening or intermediate node.

The relationship condition may include a plurality of different requirements. For example, in FIG. 15, the entity data and the relationship data may be processed to determine that the first related entity 228*b* is related to the subject entity 228*a* by a predetermined number of relationships including the relationship 230*a* and, in response, identifying that the relationship 230*a* satisfies the relationship condition. In the example of FIG. 15, the predetermined number of relationships is one. In other words, in FIG. 15, the relationship condition is satisfied where the subject entity 228*a* and the first related entity 228*b* are directly related, and are related with solely one relationship. In these examples, the relationship condition may be satisfied where the relationship includes a predetermined number of intermediate nodes between the first node and the second node, the first node being indirectly connected to the second node via the intermediate nodes.

In other examples, though, the relationship condition may be satisfied by different relationships. For example, it may be sufficient to satisfy the relationship condition with the first related entity related to the subject entity by the predetermined number of relationships, without the first related entity being directly related to the subject entity. In yet further examples, the predetermined number of relationships may be more than one. For example, the first related entity and the subject entity may satisfy the relationship condition when related by less than n relationships, where n is an integer. For example, where n is two and the first related entity and the subject entity have a first, direct, relationship, and a second, indirect, relationship via one intermediate entity, the relationship condition may be satisfied. Examples of a different relationship condition is illustrated in FIG. 16 and discussed further below.

In examples in accordance with FIGS. 14 and 15, first text is obtained using the first entity data. For example, the first text may itself correspond with an entity of the knowledge database, which is in a direct relationship with the first related entity 228*b*. For example, first text data representative of first text 232 associated with the first related entity 228*b* may be directly related to the first related entity 228*b* via a denotes or is the name of relationship, which may be represented as an edge in the knowledge database, where the knowledge database is in the form of a graph. In other examples, though, the first text 232 may be associated with the first related entity 228*b* in a different manner. In the example of FIG. 15, the first text 232 is "person", which denotes or represents the first related entity 228*b* human being. In FIG. 15, the first related entity 228*b* is also related to third text 234, which in this example is "human". Thus, in examples in accordance with FIG. 15, both the first text 232 and the third text 234 associated with the first related entity 228*b* may be obtained from the knowledge database 226, and used to generate the subject entity data set, which includes first related entity data based on the first entity data and, in these examples, the first text data 232 and the third text data 234. The subject entity data set may be used to process unstructured text data as described above to perform named entity resolution, for example to identify occurrences of the first text 232 and the third text 234 in the unstructured text and to associated these or annotate these occurrences as corresponding to the first related entity.

A different example of a relationship condition will now be explained with reference to FIG. 16. FIG. 16 shows the portion of the knowledge database 226' of FIG. 15, but with a different first related entity 228*b*' than the first related entity 228*b* of FIG. 15. Features of FIG. 16 similar to corresponding features of FIG. 15 are labelled with the same reference numeral appended with a prime (i.e. a'). Corresponding descriptions are to be taken to apply.

Figure 16:
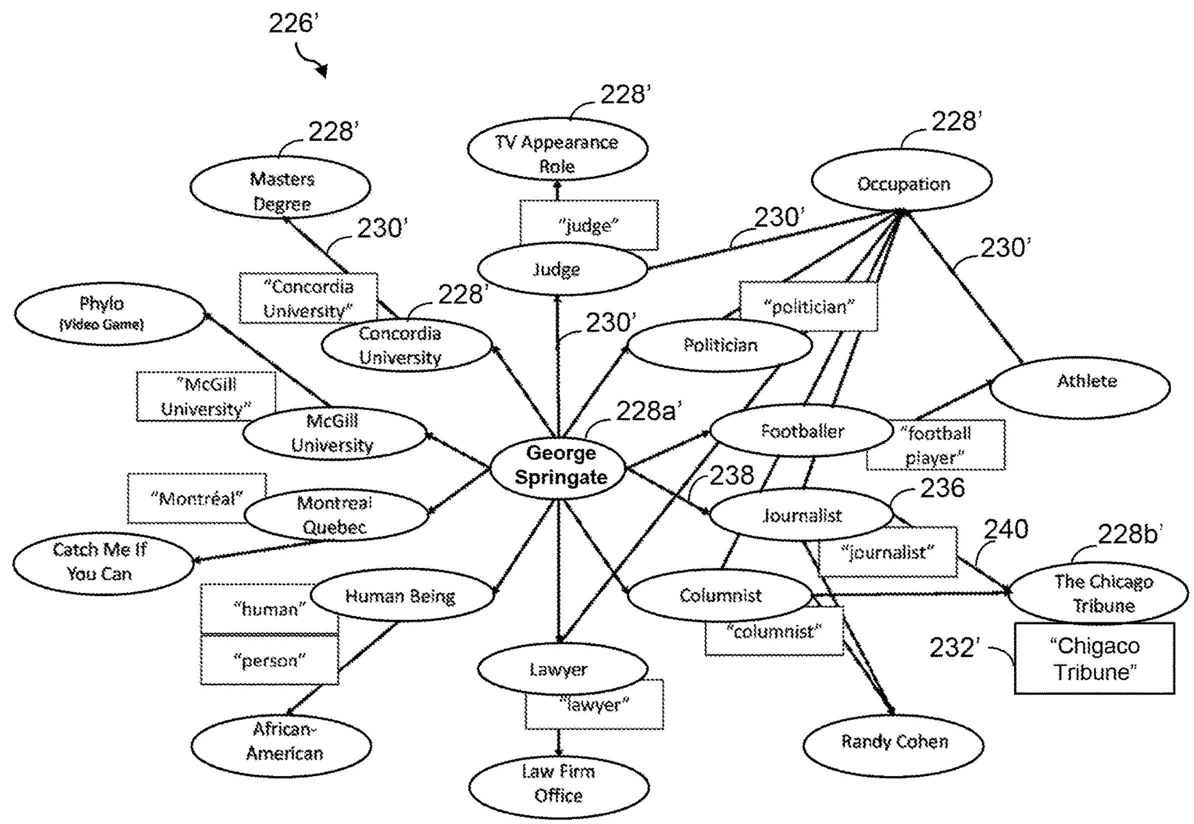
FIG. 16 shows schematically the portion of the knowledge database of FIG. 15 and illustrates an example of a first related entity and a subject entity satisfying a different example relationship condition.

In FIG. 16, the first related entity 228*b*' is The Chicago Tribune, rather than human being as in FIG. 15, but the subject entity 228*a*', 228*a* in both FIGS. 15 and 16 is George Springate. The first text 232' associated with the first related entity 228*b*' in FIG. 16 is "Chicago Tribune". In FIG. 16, the first related entity 228*b*' is indirectly related to the subject entity 228*a*' via a predetermined number of intermediate entities of the plurality of entities. In this example, the first related entity 228*b*' is related to the subject entity 228*a*' via one intermediate entity 236, which in this example is the entity journalist. Thus, in the example of FIG. 16, the predetermined number of entities to satisfy the relationship condition is one and related entities that are related to the subject entity via more or fewer than one intermediate entity are not considered to satisfy the relationship condition. In other examples, though, the predetermined number of entities may be other than one.

In some examples, including indirect relationships from the portion of the knowledge database 226' may lead to entities that are not in fact related to the subject entity being incorrectly included in the subject entity data set. In view of this, the relationship condition may be selected appropriately such that the subject entity data set includes a sufficiently large number of related entities to be able to accurately identify instances of text that denote entities that are truly related to a subject entity (sometimes referred to as true positives), without unduly increasing the rate at which text is identified as corresponding to an entity that is wrongly identified as being related to the subject entity (sometimes referred to as false positives).

In FIG. 16, the relationship between the subject entity 228*a*' and the first related entity 228*b*' includes two edges, 238, 240 of the portion of the knowledge database 226'. For example, an indirect relationship may correspond to a relationship that includes multiple tiers or stages of entities, with each tier connected by an edge of the knowledge database 226'. However, it is to be appreciated that FIG. 16 is merely an example and, in other examples, indirect relationships may be expressed differently.

In some cases, the entity data and/or the relationship data may be processed to determine a number of directly related entities directly related to the subject entity. For example, the entity data and the relationship data may be processed to calculate a number of nodes directly connected to a second node corresponding to the subject entity via a respective edge of the graph (where the knowledge database is structured as a graph). In these examples, the predetermined number of intermediate entities of the plurality of entities or a predetermined number of intermediate nodes between the first node and the second node for the relationship condition to be satisfied may depend on the number of directly related entities or the number of nodes directly connected to the second node. For example, where the subject entity is directly related to a relatively small number of directly related entities, the predetermined number of intermediate entities may be larger than otherwise, so that the subject entity data set includes a sufficiently large number of related entities so to be able to identify entities that do indeed relate to the subject entity. For a similar reason, the method may also or alternatively include processing the entity data to determine a number of further directly related entities directly related to the first related entity, for example to calculate a number of further nodes directly connected to the first node via a respective edge of the graph. In these cases, the predetermined number of intermediate entities of the plurality of entities or the predetermined number of intermediate nodes may depend on the number of further directly related entities or the number of further nodes directly connected to the first node. In this way, the number of related entities for inclusion in the subject entity data set may be altered dynamically, for example in dependence on the subject entity itself, based on the database data.

Figure 17:
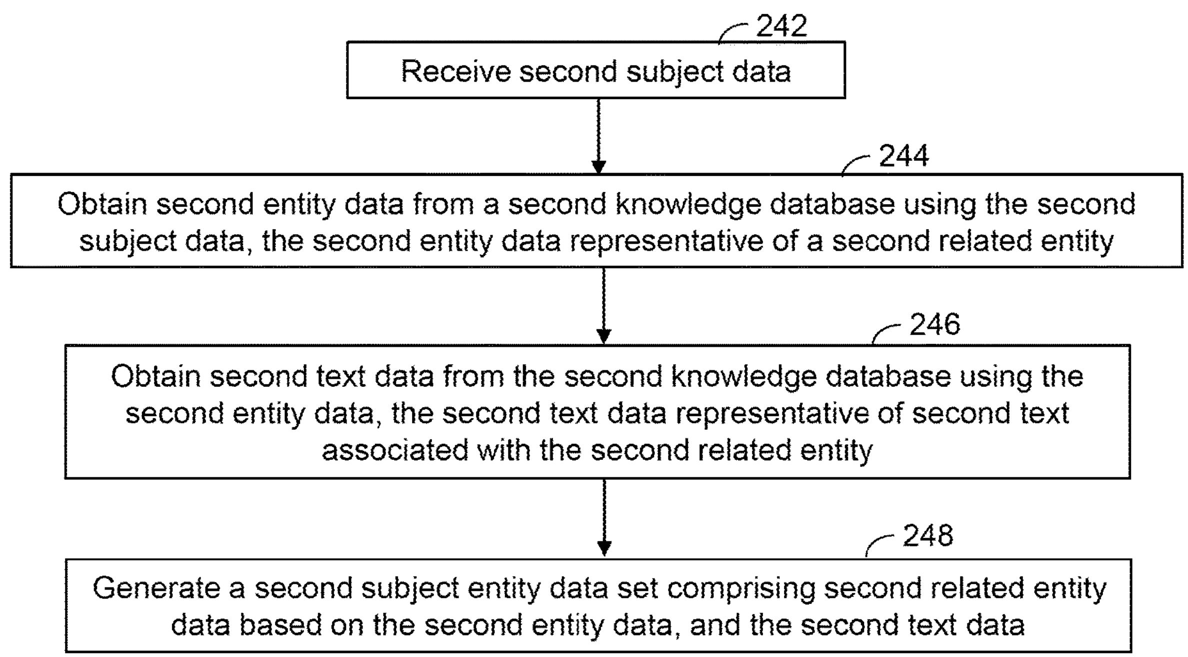
FIG. 17 is a flow diagram showing a method of generating a second subject entity data set according to examples.

FIG. 17 shows a further example of generating a subject entity data set. The method of FIG. 17 may for example be performed after the method of FIG. 14. In such cases, the subject data of FIG. 14 may be first subject data, the subject entity data set may be a first subject entity data set, and the at least a portion of the knowledge database may be a first knowledge database.

At block 242 of FIG. 17, second subject data indicative of a second subject entity different from the first subject entity is received. At block 244, second entity data, which may for example be the same as second related entity data, is obtained from a second knowledge database using the second subject data. The second knowledge database may for example represent a second portion of a master knowledge database and the first knowledge database may represent a first, different, portion of the master knowledge database. In other words, the first and second knowledge databases may represent different portions of the same knowledge database, or portions that are partially different but partially the same or overlapping. In other examples, though, the first knowledge database and the second knowledge database may be entirely different and distinct from each other. The second entity data or the second related entity data is representative of a second related entity related to the second subject entity, which may be different from or the same as the first related entity. In other words, as the second subject is different from the first subject, a different portion of the master knowledge database may be obtained, for example to include or center on the second subject rather than the first subject. However, there may be some examples in which an entity is related to both the first subject entity and the second subject entity within the knowledge database. In these cases, this entity may correspond with both the first related entity related to the first subject and the second related entity related to the second subject. In other examples, though, the first related entity and the second related entity may be different, for example where the first knowledge database does not overlap with or coincide with the second knowledge database.

At block 246, second text data representative of second text associated with the second related entity is obtained, using the second entity data, for example either from a separate source or from the second portion of the knowledge database.

If the second entity data is the same as the second related entity for storage in the second subject entity data set, the second related entity data and the second text data may be stored in the second subject entity data set. For example, the second related entity data and the second text data may be stored as second look-up table data in a second look-up table so as to indicate an association between the second related entity data and the second text data.

In other examples, such as in block 248 of the example of FIG. 17, a second subject entity data set is generated, including second related entity data based on the second entity data, and the second text data. The second related entity data may be obtained based on the second entity data similarly to the obtaining the first related entity data from the first entity data. As for the first subject entity data set, the second subject entity data set may be stored as second look-up table data in a second look-up table or may be stored in a different format, in a different structure.

The above examples are to be understood as illustrative examples. Further examples are envisaged. For example, the computer device 100 of FIGS. 1 and 13 is coupled to an audio capture device 196 (for example of the speech controlled appliance 113). However, in other examples, the computer device need not be coupled to a speech controlled appliance or an audio capture device, for example where the unstructured text data is representative of unstructured text of a document or webpage rather than unstructured text based on an utterance of a user.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of at least partially populating a first look-up table with first look-up table data related to a topic, the method comprising:

receiving topic data indicative of the topic, the topic corresponding to a particular instance of a named entity;

processing a knowledge database using the topic data to identify particular entity data representative of the particular instance of the named entity, the knowledge database comprising:

entity data representative of a plurality of instances of named entities comprising the particular instance of a named entity;

text data representative of a plurality of phrases, each of the plurality of phrases associated with an instance of the plurality of instances, respectively; and relationship data representative of relationships between respective pairs of instances of the plurality of instances, identifying first related entity data from the knowledge database, the first related entity data representative of a first instance of a named entity related to the particular instance of a named entity by a relationship which satisfies a relationship condition;

obtaining first text data from the text data of the knowledge database the first text data representative of a first phrase associated with the first instance of a named entity; and storing the first related entity data and the first text data as first look-up table data in the first look-up table so as to indicate an association between the first related entity data and the first text data.

2. The method according to claim 1, wherein the topic data is first topic data, the topic is a first topic, the particular instance of a named entity is a first particular instance of a named entity, and the knowledge database is a first knowledge database, the method comprising:

receiving second topic data indicative of a second topic, the second topic corresponding to a second particular instance of a named entity;

obtaining second related entity data from a second knowledge database using the second subject data, the second related entity data representative of a second instance of a named entity related to the second particular instance of a named entity;

obtaining second text data from the second knowledge database using the second related entity data, the second text data representative of second text associated with the second instance of a named entity; and storing the second related entity data and the second text data as second look-up table data in a second look-up table so as to indicate an association between the second related entity data and the second text data.

3. The method according to claim 1, comprising:

obtaining third text data from the text data of the knowledge database, the third text data representative of third text associated with the first instance of a named entity; and storing the third text data as part of the first look-up table data in the first look-up table so as to indicate an association between the third text data and the first instance of a named entity.

4. A method comprising:

receiving topic data indicative of a topic corresponding to a particular instance of a named entity;

obtaining first entity data from a knowledge database using the topic data, the first entity data representative of a first instance of a named entity related to the particular instance of a named entity;

obtaining first text data from the knowledge database using the first entity data, the first text data representative of a first phrase associated with the first instance of a named entity; and generating a data set related to the topic, the data set comprising:

first related entity data based on the first entity data; and the first text data.

5. The method according to claim 4, wherein:

the knowledge database comprises entity data representative of a plurality of entities, the plurality of entities comprising the first instance of a named entity and the particular instance of a named entity, the entity data comprising:

second entity data representative of the particular instance of a named entity; and the first entity data; and the method comprises processing the entity data, using the topic data, to locate the second entity data within the knowledge database.

6. The method according to claim 4, wherein the knowledge database comprises:

entity data representative of a plurality of entities, the plurality of entities comprising the first instance of a named entity and the particular instance of a named entity, the entity data comprising:

second entity data representative of the particular instance of a named entity; and the first entity data; and relationship data representative of relationships between respective pairs of entities of the plurality of entities, the method comprising processing the entity data and the relationship data to identify that the first instance of a named entity is related to the particular instance of a named entity by a relationship which satisfies a relationship condition.

7. The method according to claim 6, wherein the knowledge database is structured as a graph, the entity data representative of respective nodes of the graph and the relationship data representative of respective edges of the graph, the first instance of a named entity corresponding with a first node of the graph and the particular instance of a named entity corresponding with a second node of the graph, wherein the processing the entity data and the relationship data comprises:

processing the entity data and the relationship data to determine that the graph comprises an edge directly connecting the first node and the second node.

8. The method according to claim 6, wherein the knowledge database is structured as a graph, the entity data representative of respective nodes of the graph and the relationship data representative of respective edges of the graph, the first instance of a named entity corresponding with a first node of the graph and the particular instance of a named entity corresponding with a second node of the graph, wherein the processing the entity data and the relationship data comprises:

processing the entity data and the relationship data to determine that the relationship comprises a predetermined number of intermediate nodes between the first node and the second node, the first node being indirectly connected to the second node via the intermediate nodes.

9. The method according to claim 6, wherein the knowledge database is structured as a graph, the entity data representative of respective nodes of the graph and the relationship data representative of respective edges of the graph, the first instance of a named entity corresponding with a first node of the graph and the particular instance of a named entity corresponding with a second node of the graph, wherein the processing the entity data and the relationship data comprises:

processing the entity data to calculate a number of nodes directly connected to the second node via a respective edge of the graph; and processing the entity data and the relationship data to determine that the relationship comprises a predetermined number of intermediate nodes between the first node and the second node, the first node being indirectly connected to the second node via the intermediate nodes, wherein the predetermined number of intermediate nodes depends on the number of nodes directly connected to the second node via a respective edge of the graph.

10. The method according to claim 6, wherein the knowledge database is structured as a graph, the entity data representative of respective nodes of the graph and the relationship data representative of respective edges of the graph, the first instance of a named entity corresponding with a first node of the graph and the particular instance of a named entity corresponding with a second node of the graph, wherein the processing the entity data and the relationship data comprises:

processing the entity data to calculate a number of further nodes directly connected to the first node via a respective edge of the graph; and processing the entity data and the relationship data to determine that the relationship comprises a predetermined number of intermediate nodes between the first node and the second node, the first node being indirectly connected to the second node via the intermediate nodes, wherein the predetermined number of intermediate nodes depends on the number of further nodes directly connected to the first node via a respective edge of the graph.

11. The method according to claim 6, wherein the knowledge database is structured as a graph, the entity data representative of respective nodes of the graph and the relationship data representative of respective edges of the graph, the first instance of a named entity corresponding with a first node of the graph and the particular instance of a named entity corresponding with a second node of the graph, wherein the processing the entity data and the relationship data comprises:

processing the entity data and the relationship data to determine that the first node is connected to the second node by a predetermined number of edges.

12. The method according to claim 4, wherein the knowledge database comprises a fact triple comprising a subject, a predicate and an object, wherein:

the first entity data represents one of the subject or the object;

second entity data representative of the particular instance of a named entity represents the other of the subject or the object; and relationship data representative of a relationship between the particular instance of a named entity and the first instance of a named entity represents the predicate.

13. The method according to claim 4, comprising storing the first related entity data and the first text data within a data structure comprising the data set related to the topic so as to indicate an association between the first related entity data and the first text data.

14. The method according to claim 13, wherein the data structure is a look-up table, a hash table, or a B-tree.

15. The method according to claim 4, wherein the data set related to the topic comprises association data representative of an association between the first related entity data and the first text data.

16. The method according to claim 4, wherein the topic data is first topic data, the topic is a first topic, the particular instance of a named entity is a first particular instance of a named entity, the data set related to the topic is a first data set related to the first topic, and the knowledge database is a first knowledge database, the method comprising:

receiving second topic data indicative of a second topic, the second topic corresponding to a second particular instance of a named entity;

obtaining second entity data from a second knowledge database using the second topic data, the second entity data representative of a second instance of a named entity related to the second particular instance of a named entity;

obtaining second text data from the second knowledge database using the second entity data, the second text data representative of second text associated with the second instance of a named entity; and generating a second data set related to the second tonic, the second data set comprising:

second related entity data based on the second entity data; and the second text data.

17. The method according to claim 4, comprising obtaining third text data from the knowledge database using the first entity data, the third text data representative of third text associated with the first instance of a named entity, the generating the data set related to the topic comprising generating the data set related to the topic comprising the third text data.

18. A system comprising:

at least one processor;

at least one memory comprising computer program instructions, the at least one memory and the computer program instructions operable to, with the at least one processor:

receive topic data indicative of a topic corresponding to a particular instance of a named entity;

obtain first entity data from a knowledge database using the topic data, the first entity data representative of a first instance of a named entity related to the particular instance of a named entity;

obtain first text data from the knowledge database using the first entity data, the first text data representative of a first phrase associated with the first instance of a named entity; and generate a data set related to topic, the data set comprising:

first related entity data based on the first entity data; and the first text data.

19. The system according to claim 18, the at least one memory and the computer program instructions operable to, with the at least one processor:

store the first related entity data and the first text data within a data structure comprising the data set related to the topic so as to indicate an association between the first related entity data and the first text data.

20. The system according to claim 19, wherein the data structure is a look-up table, a hash table, or a B-tree.

* * * * *